United States Patent
Sun et al.

(10) Patent No.: US 12,073,022 B2
(45) Date of Patent: Aug. 27, 2024

(54) AUGMENTED TACTILE/HAPTIC RING FOR METAVERSE

(71) Applicant: National University of Singapore, Singapore (SG)

(72) Inventors: Zhongda Sun, Singapore (SG); Chengkuo Lee, Singapore (SG); Minglu Zhu, Singapore (SG)

(73) Assignee: NATIONAL UNIVERSITY OF SINGAPORE, Singapore (SG)

( * ) Notice: Subject to any disclaimer, the term of this patent is extended or adjusted under 35 U.S.C. 154(b) by 0 days.

(21) Appl. No.: 18/209,566

(22) Filed: Jun. 14, 2023

(65) Prior Publication Data
US 2023/0409114 A1 Dec. 21, 2023

Related U.S. Application Data

(60) Provisional application No. 63/352,712, filed on Jun. 16, 2022.

(51) Int. Cl.
*G06F 3/01* (2006.01)
*H02N 1/04* (2006.01)

(52) U.S. Cl.
CPC .............. *G06F 3/014* (2013.01); *G06F 3/016* (2013.01); *G06F 3/017* (2013.01); *H02N 1/04* (2013.01)

(58) Field of Classification Search
CPC .......... G06F 3/011; G06F 3/014; G06F 3/016; G06F 3/017; H02N 1/04; F15B 15/10; G04G 21/025; A61B 5/7405; H02M 3/156
See application file for complete search history.

(56) References Cited

U.S. PATENT DOCUMENTS

| | | | | |
|---|---|---|---|---|
| 10,772,394 B1* | 9/2020 | Michalske | ........... | G04G 21/025 |
| 2014/0267024 A1* | 9/2014 | Keller | ..................... | G06F 3/014 |
| | | | | 345/156 |
| 2015/0293545 A1* | 10/2015 | Cui | ........................ | H02M 3/156 |
| | | | | 323/281 |
| 2016/0313798 A1* | 10/2016 | Connor | .................... | G06F 3/017 |

(Continued)

OTHER PUBLICATIONS

Guo, X. et al. Artificial intelligence-enabled caregiving walking stick powered by ultra-low-frequency human motion. ACS Nano 15, 19054-19069 (2021).

(Continued)

*Primary Examiner* — Richard J Hong
(74) *Attorney, Agent, or Firm* — Grogan, Tuccillo & Vanderleeden, LLP

(57) ABSTRACT

A system to provide a human-machine interface to enable a user in a real space to act/sense in a virtual space. The system includes: a ring wearable by a finger of the user; a plurality of sensors, and a plurality of feedback units. The plurality of sensors being multimodal, including: a tactile sensor disposed on an inner surface of the ring; and a temperature sensor disposed on an outer surface of the ring. The plurality of feedback units being multimodal, including: a vibrator disposed on the ring, the vibrator being disposed on the outer surface of the ring; and a heater disposed on the inner surface of the ring. The system includes a controller configured to drive the plurality of sensors and the plurality of feedback devices to enable concurrent multimodal sensing and multimodal feedback.

20 Claims, 25 Drawing Sheets

(56) References Cited

U.S. PATENT DOCUMENTS

| | | | |
|---|---|---|---|
| 2020/0035071 A1* | 1/2020 | Anderson | F15B 15/10 |
| 2022/0361810 A1* | 11/2022 | Price | A61B 5/7405 |

OTHER PUBLICATIONS

Kim, K. et al. Tactile avatar: tactile sensing systemmimicking human tactile cognition. Adv. Sci. 8, 2002362 (2021).

Fan, T. et al. Analog sensing and computing systems with low power consumption for gesture recognition. Adv. Intell. Syst. 3, 2000184 (2021).

Maharjan, P. et al. A human skin-inspired self-powered flex sensor with thermally embossed microstructured triboelectric layers for sign language interpretation. Nano Energy 76, 105071 (2020).

Zhou, Z. et al. Sign-to-speech translation using machine-learning-assisted stretchable sensor arrays. Nat. Electron. 3, 571-578 (2020).

Wen, F., Zhang, Z., He, T. & Lee, C. AI enabled sign language recognition and VR space bidirectional communication using triboelectric smart glove. Nat. Commun. 12, 5378 (2021).

Hughes, J. et al. A simple, inexpensive, wearable glove with hybrid resistive-pressure sensors for computational sensing, proprioception, and task identification. Adv. Intell. Syst. 2, 2000002 (2020).

Zhu, M., Sun, Z. & Lee, C. Soft modular glove with multimodal sensing and augmented haptic feedback enabled by materials' multifunctionalities. ACS Nano. https://doi.org/10.1021/acsnano.2c04043 (2022).

Sundaram, S. et al. Learning the signatures of the human grasp using a scalable tactile glove. Nature 569, 698-702 (2019).

Kim, K. K. et al.A deep-learned skin sensor decoding the epicentral human motions. Nat. Commun. 11, 2149 (2020).

Ko, S. H. & Rogers, J. Functional materials and devices for XR (VR/ AR/MR) applications. Adv. Funct. Mater. 31, 2106546 (2021).

Kang, B. B., Choi, H., Lee, H. & Cho, K.-J. J. Exo-glove poly II: a polymer-based soft wearable robot for the hand with a tendondriven actuation system. Soft Robot. 6, 214-227 (2019).

Gao, Y. et al. Wearable Microfluidic Diaphragm Pressure Sensor for Health and Tactile Touch Monitoring. Adv. Mater. 29, 1-8 (2017).

Hinchet, R. & Shea, H.High force density textile electrostatic clutch. Adv. Mater. Technol. 5, 1900895 (2020).

Shi, Y. et al. Self-powered electro-tactile system for virtual tactile experiences. Sci. Adv. 7, eabe2943 (2021).

Suzuki, K. et al. Rapid-Response, Widely Stretchable Sensor of Aligned MWCNT/Elastomer Composites for Human Motion Detection. ACS Sensors 1, 817-825 (2016).

Liu, Y. et al. Electronic skin as wireless human-machine interfaces for robotic VR. Sci. Adv. 8, eabl6700 (2022).

Wang, X., Mitchell, S. K., Rumley, E.H., Rothemund, P. & Keplinger, C. High-strain peano-HASEL actuators. Adv. Funct. Mater. 30, 1908821 (2020).

Ji, X. et al. Untethered feel-through haptics using 18-μm thick dielectric elastomer actuators. Adv. Funct. Mater. 31, 2006639 (2021).

Kurita, Y., Shinohara,M. & Ueda, J.Wearable sensorimotor enhancer for fingertip based on stochastic resonance effect. IEEE Trans. Hum.-Mach. Syst. 43, 333-337 (2013).

Jung, Y. H., Kim, J. H. & Rogers, J. A. Skin-integrated vibrohaptic interfaces for virtual and augmented reality. Adv. Funct. Mater. 31, 2008805 (2021).

Jung, Y. H. et al. A wireless haptic interface for programmable patterns of touch across large areas of the skin. Nat. Electron. 5, 374-385 (2022).

Hong, S. et al. Highly stretchable and transparent metal nanowire heater for wearable electronics applications. Adv. Mater. 27, 4744-4751 (2015).

Liu, P. et al. Stretchable and energy-efficient heating carbon nanotube fiber by designing a hierarchically helical structure. Small 14, 1702926 (2018).

Lee, J. et al. Stretchable skin-like cooling/heating device for reconstruction of artificial thermal sensation in virtual reality. Adv. Funct. Mater. 30, 1909171 (2020).

Hong, S. et al. Wearable thermoelectrics for personalized thermoregulation. Sci. Adv. 5, eaaw0536 (2019).

Zhang, G. et al. Toward wearable cooling devices: highly flexible electrocaloric Ba0.67Sr0.33TiO3Nanowire arrays. Adv. Mater. 28, 4811-4816 (2016).

Lee, J., Kim, D., Sul, H. & Ko, S. H. Thermo-haptic materials and devices for wearable virtual and augmented reality. Adv. Funct. Mater. 31, 2007376 (2021).

Kim, D. et al. Highly stretchable and oxidation-resistiveCu nanowire heater for replication of the feeling of heat in a virtual world. J. Mater. Chem. A 8, 8281-8291 (2020).

Gunawardhana, K. R. S. D., Wanasekara, N. D. & Dharmasena, R. D. I. G. Towards Truly Wearable Systems: Optimizing and Scaling Up Wearable Triboelectric Nanogenerators. iScience 23, 101360 (2020).

Huang, H. et al. Experiment and investigation of two types of vibrotactile devices. in 2016 6th IEEE International Conference on Biomedical Robotics and Biomechatronics (BioRob) vols. 2016-Jul. 1266-1271 (IEEE, 2016).

Fan, F.-R., Tian, Z.-Q. & Lin Wang, Z. Flexible triboelectric generator. Nano Energy 1,328-334 (2012).

Zi, Y. et al. Triboelectric-Pyroelectric-Piezoelectric Hybrid Cell for High-Efficiency Energy-Harvesting and Self-Powered Sensing. Adv. Mater. 27, 2340-2347 (2015).

Ha, M. et al. Skin-Inspired Hierarchical Polymer Architectures with Gradient Stiffness for Spacer-Free, Ultrathin, and Highly Sensitive Triboelectric Sensors. ACS Nano 12, 3964-3974 (2018).

Dong, K. et al. Versatile Core-SheathYarn for Sustainable Biomechanical Energy Harvesting and Real-Time Human-Interactive Sensing. Adv. Energy Mater. 8, 1-12 (2018).

Lu, C. et al. A Stretchable, Flexible Triboelectric Nanogenerator for Self-Powered Real-Time Motion Monitoring. Adv. Mater. Technol. 3, 1-8 (2018).

He, Q. et al. An all-textile triboelectric sensor for wearable teleoperated humanmachine interaction. J. Mater. Chem. A 7, 26804-26811 (2019).

Liao, J. et al. Nestable arched triboelectric nanogenerator for large deflection biomechanical sensing and energy harvesting. Nano Energy 69, 104417 (2020).

Luo, Y. et al. Triboelectric bending sensor based smart glove towards intuitive multidimensional human-machine interfaces. Nano Energy 89, 106330 (2021).

Qin, K. et al. Magnetic Array Assisted Triboelectric Nanogenerator Sensor for Real-Time Gesture Interaction. Nano-Micro Lett. 13, (2021).

Araromi, O. A. et al. Ultra-sensitive and resilient compliant strain gauges for soft machines. Nature 587, 219-224 (2020).

Moin, A. et al. A wearable biosensing system with in-sensor adaptive machine learning for hand gesture recognition. Nat. Electron. 4, 54-63 (2021).

Choi, S. et al. Stretchable Heater Using Ligand-Exchanged Silver Nanowire Nanocomposite for Wearable Articular Thermotherapy. ACS Nano 9, 6626-6633 (2015).

Liu, P. et al. Stretchable and Energy-Efficient Heating Carbon Nanotube Fiber by Designing a Hierarchically Helical Structure. Small 14, 1-6 (2018).

Luo, X. et al. Multifunctional fabrics of carbon nanotube fibers. J. Mater. Chem. A 7, 8790-8797 (2019).

Zhou, J. et al. High-ampacity conductive polymer microfibers as fast response wearable heaters and electromechanical actuators. J. Mater. Chem. C 4, 1238-1249 (2016).

Guo, R. et al. Semi-Liquid-Metal-(Ni—EGaIn)-Based Ultraconformable Electronic Tattoo. Adv. Mater. Technol. 4, 1-11 (2019).

Wang, Y. et al. Printable Liquid-Metal@PDMS Stretchable Heater with High Stretchability and Dynamic Stability for Wearable Thermotherapy. Adv. Mater. Technol. 4, 1-9 (2019).

Lee, D. et al. Liquid-metal-electrode-based compact, flexible, and high-power thermoelectric device. Energy 188, 116019 (2019).

(56) References Cited

OTHER PUBLICATIONS

M. Zhu, Z. Sun, Z. Zhang, Q. Shi, T. He, H. Liu, T. Chen, C. Lee, Haptic-feedback smart glove as a creative human-machine interface (HMI) for virtual/augmented reality applications. Sci. Adv. 6, eaaz8693 (2020).
Song, K., Kim, S. H., Jin, S., Kim, S., Lee, S., Kim, J. S., . . . & Cha, Y. (2019). Pneumatic actuator and flexible piezoelectric sensor for soft virtual reality glove system. Scientific reports, 9(1), 1-8.
Kim, S. W., Kim, S. H., Kim, C. S., Yi, K., Kim, J. S., Cho, B. J., & Cha, Y. (2020). Thermal display glove for interacting with virtual reality. Scientific reports, 10(1), 1-12.
Oh, J., Kim, S., Lee, S., Jeong, S., Ko, S. H., & Bae, J. (2021). A liquid metal based multimodal sensor and haptic feedback device for thermal and tactile sensation generation in virtual reality. Advanced Functional Materials, 31(39), 2007772.
Q. Shi et al., Progress in wearable electronics/photonics—Moving toward the era of artificial intelligence and internet of things. InfoMat, vol. 2, No. 6, pp. 1131-1162, Nov. 2020, doi:10.1002/inf2.12122.
M. Wang et al., Nat. Electron., vol. 3, No. 9, pp. 563-570, Sep. 2020, doi:10.1038/s41928-020-0422-z.
M. Zhu, T. He and C. Lee, Appl. Phys. Rev., vol. 7, No. 3, pp. 031305, Sep. 2020, doi:10.1063/5.0016485.
F. Wen et al., Adv. Sci., vol. 7, No. 14, pp. 2000261, Jul. 2020, doi:10.1002/advs.202000261.
X. Yu et al., Nature, vol. 575, No. 7783, pp. 473-479, Nov. 2019, doi:10.1038/s41586-019-1687-0.
Sun, Z., Zhu, M., Shan, X. et al. Augmented tactile-perception and haptic-feedback rings as human-machine interfaces aiming for immersive interactions. Nat Commun 13, 5224 (2022). https://doi.org/10.1038/s41467-022-32745-8.
https://static-content.springer.com/esm/art%3A10.1038%2Fs41467-022-32745-8/MediaObjects/41467_2022_32745_MOESM1_ESM.pdf.
Dionisio, J. D. N., Burns, W. G. III & Gilbert, R. 3D Virtualworlds and the metaverse. ACM Comput. Surv. 45, 1-38 (2013).
Psotka, J. Immersive training systems: Virtual reality and education and training. Instr. Sci. 23, 405-431 (1995).
Zhan, T., Yin, K., Xiong, J., He, Z. & Wu, S. T. Augmented reality and virtual reality displays: perspectives and challenges. iScience 23,101397 (2020).
Kim, Minwoo, et al. IMU Sensor-Based Hand Gesture Recognition forHuman-Machine Interfaces. Sensors, 19, 3827 (2019).
Faisal, A. Visionary of virtual reality. Nature 551, 298-299 (2017).
Kim, H. et al. Recent advances in wearable sensors and integrated functional devices for virtual and augmented reality applications. Adv. Funct. Mater. 31, 2005692 (2021).
Rautaray, S. S. & Agrawal, A. Vision based hand gesture recognition for human computer interaction: a survey. Artif. Intell. Rev. 43, 1-54 (2015).
Kim, M., Cho, J., Lee, S. & Jung, Y. IMU sensor-based hand gesture recognition for human-machine interfaces. Sensors 19, 3827 (2019).
Wang, Y.,Wang, Y. & Yang, Y. Graphene-polymer nanocomposite based redox-induced electricity for flexible self-powered strain sensors. Adv. Energy Mater. 8, 1800961 (2018).
Zhu, H. et al. Versatile electronic skins formotion detection of joints enabled by aligned few-walled carbon nanotubes in flexible polymer composites. Adv. Funct. Mater. 27, 1606604 (2017).
Navaraj, W. & Dahiya, R. Fingerprint-enhanced capacitive-piezoelectric flexible sensing skin to discriminate static and dynamic tactile stimuli. Adv. Intell. Syst. 1, 1900051 (2019).
Lee, J. et al. Conductive fiber-based ultrasensitive textile pressure sensor for wearable electronics. Adv. Mater. 27, 2433-2439 (2015).
Guo, J. et al. Highly stretchable, strain sensing hydrogel optical fibers. Adv. Mater. 28, 10244-10249 (2016).
Bai, H. et al. Stretchable distributed fiber-optic sensors. Science 370, 848-852 (2020).
Liu, Z. et al. Wearable and implantable triboelectric nanogenerators. Adv. Funct. Mater. 29, 1808820 (2019).
Zhu, M., Yi, Z., Yang, B. & Lee, C. Making use of nanoenergy from human—Nanogenerator and self-powered sensor enabled sustainable wireless IoT sensory systems. Nano Today 36, 101016 (2021).
Nozariasbmarz, A. et al. Review of wearable thermoelectric energy harvesting: From body temperature to electronic systems. Appl. Energy 258, 114069 (2020).
Bowen, C. R. et al. Pyroelectric materials and devices for energy harvesting applications. Energy Environ. Sci. 7, 3836-3856 (2014).
Sun, Z., Zhu, M. & Lee, C. Progress in the triboelectric human-machine interfaces (HMIs)-moving fromsmart gloves to AI/ Haptic enabled HMI in the 5G/IoT era. Nanoenergy Adv. 1, 81-120 (2021).
Pu, X., An, S., Tang, Q., Guo, H. & Hu, C. Wearable triboelectric sensors for biomedical monitoring and human-machine interface. iScience 24, 102027 (2021).
He, T. et al. Self-powered glove-based intuitive interface for diversified control applications in real/cyber space. Nano Energy 58, 641-651 (2019).
Zhu, M., Sun, Z., Chen, T. & Lee, C. Low cost exoskeleton manipulator using bidirectional triboelectric sensors enhanced multiple degree of freedom sensory system. Nat. Commun. 12, 2692 (2021).
Li, C. et al. Sensing of joint and spinal bending or stretching via a retractable and wearable badge reel. Nat. Commun. 12, 2950 (2021).
Pu, X. et al. Rotation sensing and gesture control of a robot joint via triboelectric quantization sensor. Nano Energy 54, 453-460 (2018).
Jin, L., Tao, J., Bao, R., Sun, L. & Pan, C. Self-powered real-time movement monitoring sensor using triboelectric nanogenerator technology. Sci. Rep. 7, 10521 (2017).
Dong, B. et al. Wearable triboelectric-human-machine interface (THMI) using robust nanophotonic readout. ACS Nano 14, 8915-8930 (2020).
Yang, Y., Wang, S., Zhang, Y. & Wang, Z. L. Pyroelectric nanogenerators for driving wireless sensors. Nano Lett. 12, 6408-6413 (2012).
Yang, Y. et al. Pyroelectric nanogenerators for harvesting thermoelectric energy. Nano Lett. 12, 2833-2838 (2012).
Yang, Y. et al. Flexible pyroelectric nanogenerators using a composite structure of lead-free KNbO3 nanowires. Adv. Mater. 24, 5357-5362 (2012).
Song, K., Zhao, R., Wang, Z. L. & Yang, Y. Conjuncted pyro-piezoelectric effect for self-powered simultaneous temperature and pressure sensing. Adv. Mater. 31, 1902831 (2019).
Yang, Y., Zhou, Y., Wu, J. M. & Wang, Z. L. Single micro/nanowire pyroelectric nanogenerators as self-powered temperature sensors. ACS Nano 6, 8456-8461 (2012).
Wang, Y. et al. Hierarchically patterned self-powered sensors for multifunctional tactile sensing. Sci. Adv. 6, eabb9083 (2020).
Sun, Z. et al. Artificial intelligence of things (AIoT) enabled virtual shop applications using self-powered sensor enhanced soft robotic manipulator. Adv. Sci. 8, 2100230 (2021).
Shi, Q. et al. Deep learning enabled smart mats as a scalable floor monitoring system. Nat. Commun. 11, 4609 (2020).
Zhang, Z. et al. Deep learning-enabled triboelectric smart socks for IoT-based gait analysis and VR applications. NPJ Flex. Electron. 4, 29 (2020).
Qin, Ken et al. Magnetic Array Assisted Triboelectric Nanogenerator Sensor for Real Time Gesture Interaction. Nano-Micro Letters. 13:51 (2021).
Shi, Q. et al. Artificial intelligence of things (AIoT) enabled floor monitoring system for smart home applications. ACS Nano 15, 18312-18326 (2021).
Zhang, Z. et al. Artificial intelligence of toilet (AI-Toilet) for an integrated health monitoring system (IHMS) using smart triboelectric pressure sensors and image sensor. Nano Energy 90, 106517 (2021).

* cited by examiner

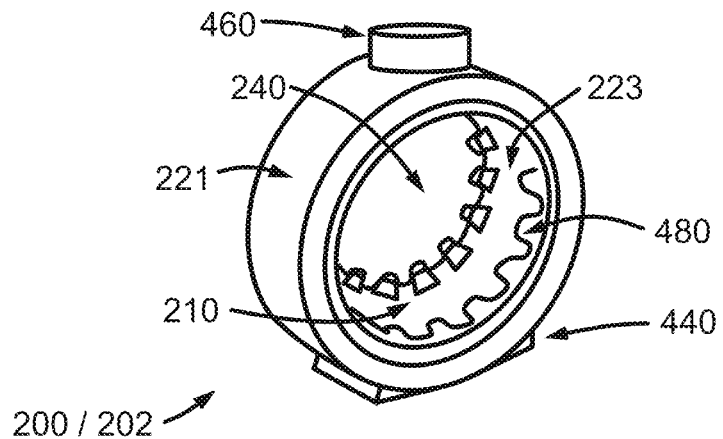
FIG. 3
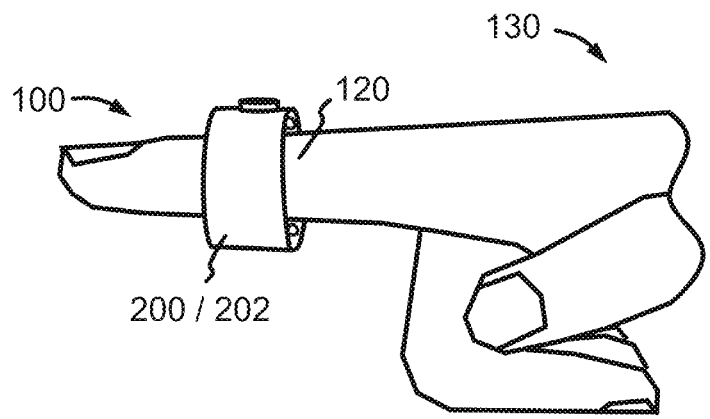
FIG. 4A
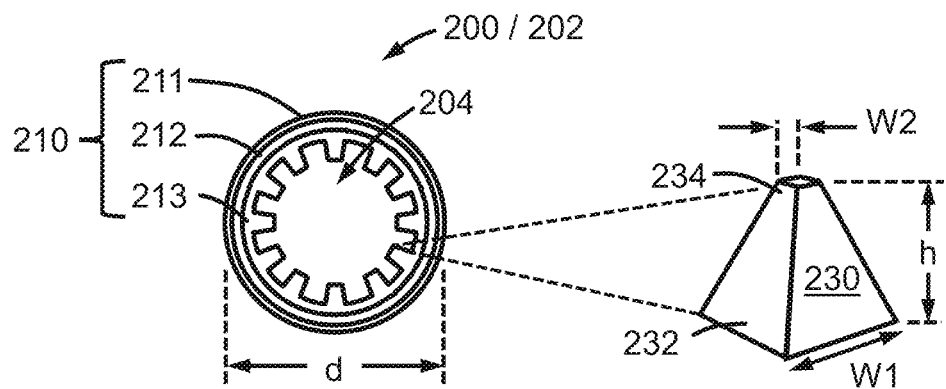
FIG. 4B
FIG. 4C

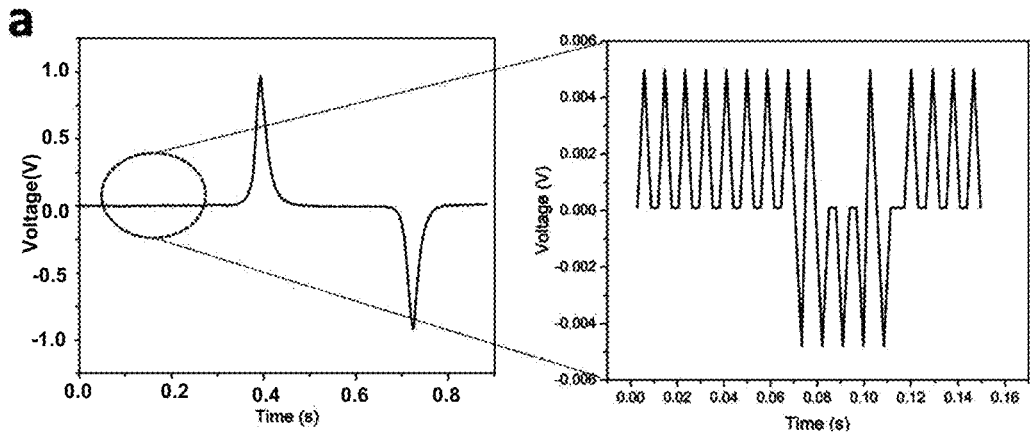
FIG. 15A
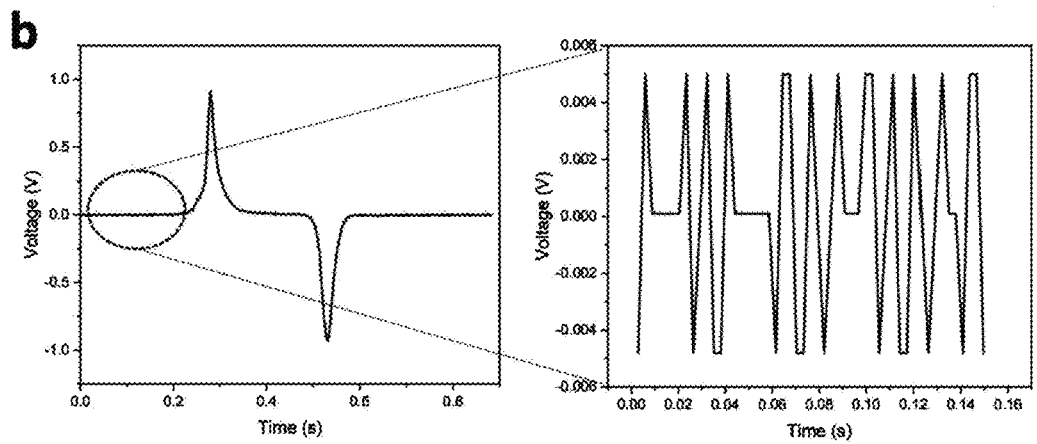
FIG. 15B
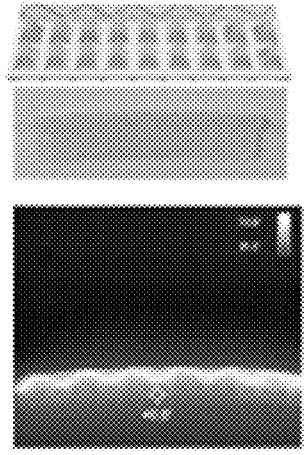
FIG. 16A
FIG. 16B
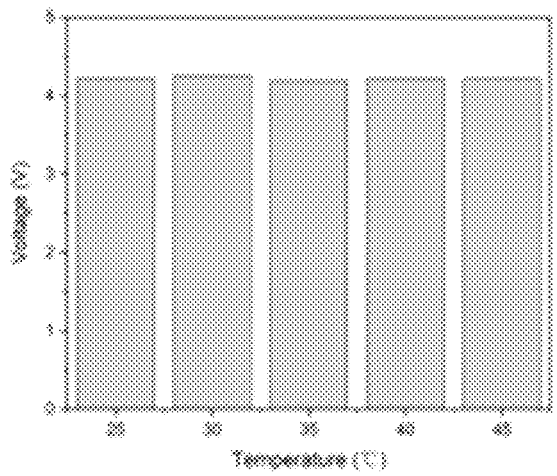
FIG. 16C

US 12,073,022 B2

AUGMENTED TACTILE/HAPTIC RING FOR METAVERSE

CROSS-REFERENCE TO RELATED APPLICATION

This application claims priority to the U.S. patent application no. 63/352,712 filed Jun. 16, 2022, the contents of which are incorporated herein by reference.

TECHNICAL FIELD

The present disclosure relates to the field of tactile/haptic devices for augmented reality/virtual reality applications.

BACKGROUND

The term "metaverse" refers to a network of three-dimensional (3D) virtual worlds. While augmented reality (AR) and/or virtual reality (VR) devices can potentially enhance the connections between real space and cyberspace, the conventional AR/VR device cannot fully bridge the real space with the cyberspace. The complexity of human activities is such that the computing time and power of various functions involved in processing one simple daily task would require the conventional AR/VR device to be so bulky that it would not be practical for the AR/VR device to be used throughout the day for a fully immersive AR/VR lifestyle.

SUMMARY

In one aspect, the present application discloses a system to provide a human-machine interface to enable a user in a real space to act/sense in a virtual space. The system includes: a ring wearable by a finger of the user; a plurality of sensors, and a plurality of feedback units. The plurality of sensors being multimodal, including: a tactile sensor disposed on an inner surface of the ring; and a temperature sensor disposed on an outer surface of the ring. The plurality of feedback units being multimodal, including: a vibrator disposed on the ring, the vibrator being disposed on the outer surface of the ring; and a heater disposed on the inner surface of the ring. The system includes a controller configured to drive the plurality of sensors and the plurality of feedback devices to enable concurrent multimodal sensing and multimodal feedback.

In another aspect, the present application discloses a system to provide a human-machine interface to enable a user in a real space to act/sense in a virtual space. The system preferably includes a triboelectric nanogenerator (TENG) sensor wearable by the user and a controller. The controller is configured to receive an input signal from the TENG sensor responsive to a movement of the TENG sensor. The controller is configured to execute instructions stored in a computer-readable medium to perform a method including determining an output signal based on a voltage integration of the input signal.

In another aspect, the present application discloses a non-transitory computer readable storage medium storing instructions that, when executed by a controller, causes the system to perform a method of human-machine interface to enable a user in a real space to act/sense in a virtual space. The method includes: receiving an input signal from a wearable sensor, determining an output signal corresponding to a voltage integration of the input signal; and using the output signal to configure an object in the virtual space. The wearable sensor is configured to provide the input signal responsive to one or more actions of a user in the real space.

BRIEF DESCRIPTION OF DRAWINGS

FIG. 3 is a schematic perspective view of a ring according to embodiments of the present system;

FIGS. 4A to 4E are schematic diagrams illustrating the ring of FIG. 3;

FIGS. 15A and 15B are plots showing the influence of vibration by the vibrator on the tactile sensor of the same device;

FIGS. 16A to 16C diagrammatically show the influence of heating by the heater on the tactile sensor of the same device;

DETAILED DESCRIPTION

Reference throughout this specification to "one embodiment", "another embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment. Furthermore, the described features, structures, or characteristics may be combined in any suitable manner in one or more embodiments. In the following description, numerous specific details are provided to give a thorough understanding of embodiments. One skilled in the relevant art will recognize that the various embodiments may be practiced without one or more of the specific details, or with other methods, components, materials, etc. In other instances, some or all known structures, materials, or operations may not be shown or described in detail to avoid obfuscation.

The word "exemplary" is used herein to mean "serving as an example, instance, or illustration." Any embodiment described herein as "exemplary" is not necessarily to be construed as preferred or advantageous over other embodiments. As used herein, the singular 'a' and 'an' may be construed as including the plural "one or more" unless apparent from the context to be otherwise.

Terms such as "first" and "second" are used in the description and claims only for the sake of brevity and clarity, and do not necessarily imply a priority or order, unless required by the context. The terms "about" and "approximately" as applied to a stated numeric value encompasses the exact value and a reasonable variance as will be understood by one of ordinary skill in the art, and the terms "generally" and "substantially" are to be understood in a similar manner, unless otherwise specified.

Figure 1:
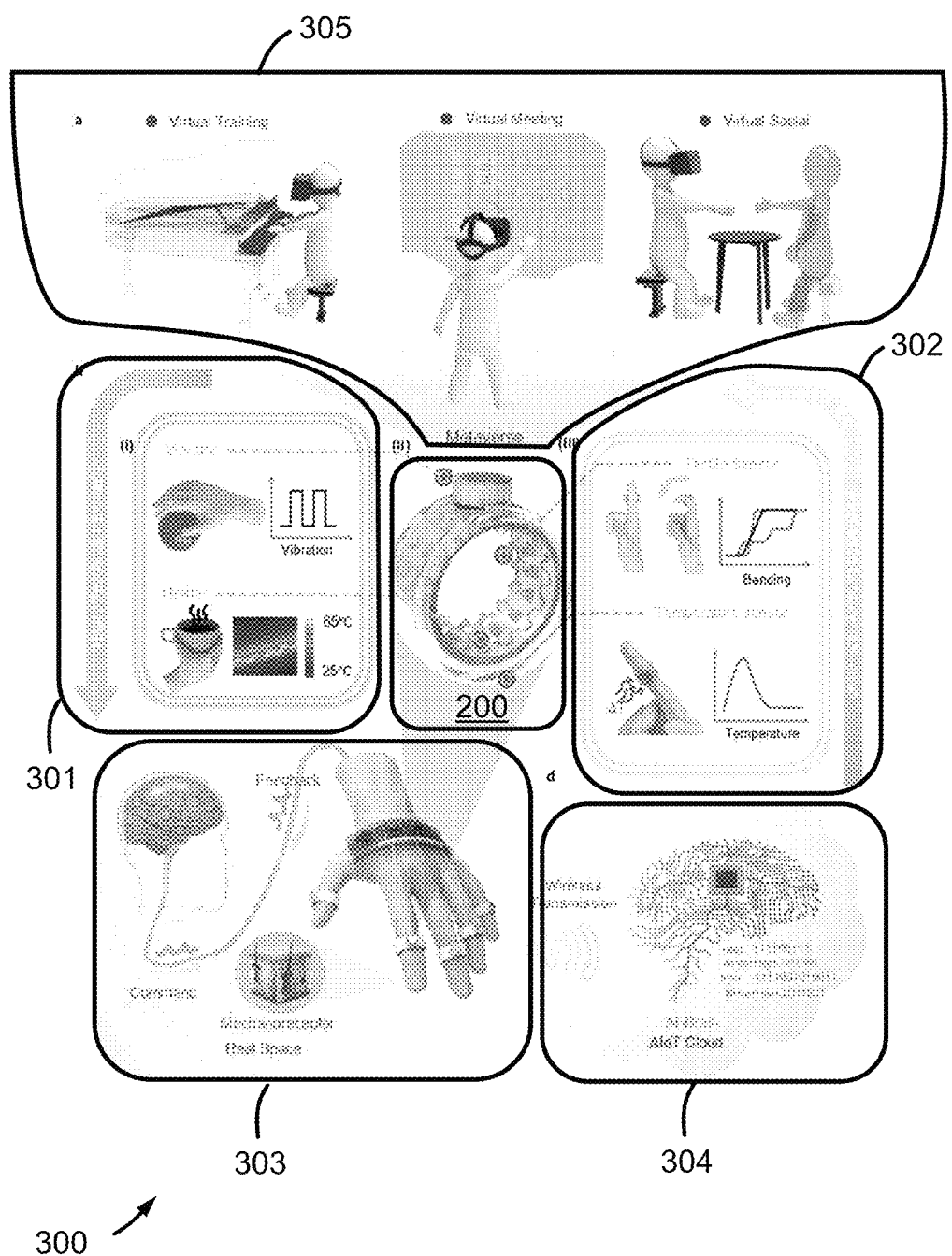
FIG. 1 schematically illustrates a system according to embodiments of the present disclosure.

FIG. 1 schematically illustrates a system 300 for providing a richer metaverse virtual space. The system 300 includes a human-machine interface device 200 (also referred to as "device" for the sake of brevity). The device 200 integrates multiple modes of haptic feedback (301) (including but not limited to vibrational feedback, temperature feedback, etc.) and multiple modes of sensing (302) (including but not limited to temperature sensing, tactile sensing, etc.). That is, in some embodiments, a feedback functionality may be provided by an integrated vibrator and heater, and a sensing functionality may be provided by an integrated tactile and temperature sensor. Part of the user's experience in the virtual space may be informed by a combination of an output signal of the device 200 and the user's natural (unaided) senses (303), including but not limited to mechanoreceptors (e.g., finger tips). That is, in some embodiments, the system 300 further integrates human finger sensation in real space to enrich the virtual space experience. The system 300 preferably includes wireless communications (304) with a cloud server, also referred to as an artificial intelligence-of-things (AIoT Cloud) cloud server for processing of the collected data/information. The more realistic and more complete experience in virtual space enabled by the system 300 can enable or facilitate more effective virtual training, virtual meetings, and virtual social experiences (305). This will be further evident from the examples described below.

Another aspect of the present disclosure describes a system 300 in which the system 300 includes at least one device 200 configured to serve as a human-machine interface. The system 300 may include a set of one or more devices 200. The device 200 integrates multiple modes of sensing with multiple modes of feedback, in a physically compact form that is wearable while posing little interference with normal daily tasks. The device 200 may be variously shaped and sized such that it can be wearable by or attachable to a user. In some preferred embodiments, devices 200 may also be referred to as augmented tactile-perception and haptic-feedback rings ("ATH-Rings") 202. For the sake of brevity, the terms "device", "ring", and "ATH-Ring" will be used interchangeably in the present disclosure.

Figure 2A:
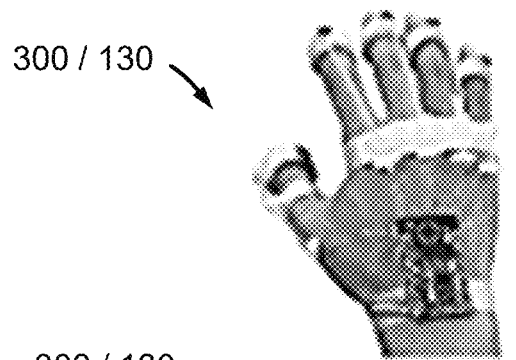
FIG. 2A and FIG. 2B show two sides of a hand with devices of the present disclosure.
Figure 2B:
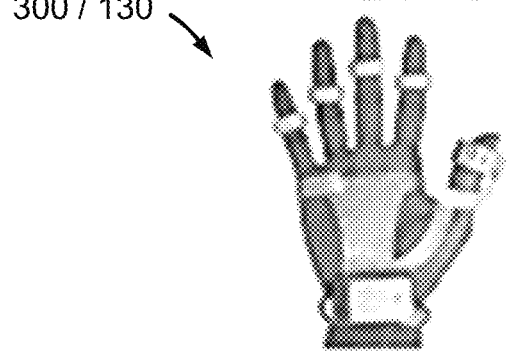

FIG. 2A and FIG. 2B show two sides of a hand 130, with each finger 100 (e.g., including all five digits of one hand 130) wearing a respective one of a plurality of rings 202 (e.g., five rings). As used herein, the terms "finger" and "digit" are used interchangeably to refer to any finger or thumb. Each ring 202 is connected (wirelessly or via wires) to an Internet-of-Things (IoT) module which is optionally worn at the back of the hand (alternatively, in some situations, at the wrist or at the palm-side of the hand). Optionally, wires electrically connecting each of the rings to the processor may be disposed in or extend through respective polytetrafluoroethylene (PTFE) tubes. The tubes may be provided to strengthen the connections between different components. A battery or power bank 416 is optionally worn at the wrist. Each ring 202 performs sensing and/or feedback independently of any other ring in the system 300. The IoT module may include a signal processing circuit, a wireless transmission unit 414, and a microcontroller unit (MCU) 412 with embedded analog-to-digital converters (ADC) and pulse width modulation (PWM) pins to drive the one or more haptic feedback unit. The terms "controller", "MCU", "IoT module", "processor", "processing circuit", "computing device", etc., may be used interchangeably in the present disclosure in a general sense in referring to a programmable device which includes at least one computer-readable medium storing instructions executable to perform various embodiments of the present method or to control various embodiments of the present system.

Figure 2C:
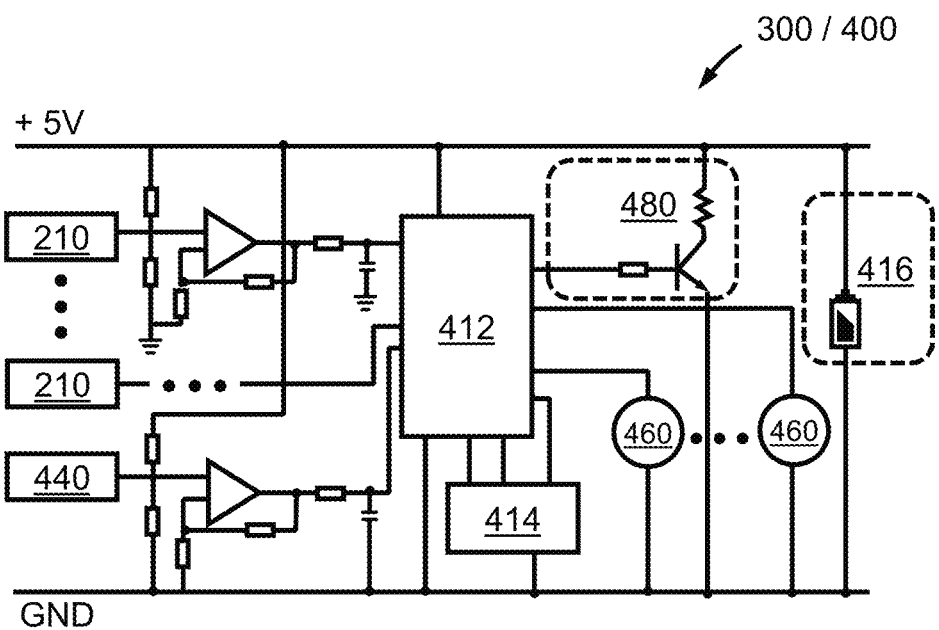
FIG. 2C is diagram of an exemplary circuit 400 for an embodiment of the system for one hand.

FIG. 2C is diagram of an exemplary circuit 400 for an embodiment of the system 300 for one hand. Each of five tactile sensors 420 is connected to the controller 412 independently of any other of the tactile sensors 420. A temperature sensor 440 is connected to the controller 412 independently of any of the tactile sensors 420. The controller 412 is also programmed to drive each of five vibrators 460 and a heater 480.

A wireless module 414 is connected to the controller 412 to enable wireless communication with a remote computing device, e.g., a cloud server. A battery 416 or power bank may be provided to power the controller 412, the wireless module 313 and respective ones of the sensing units and/or feedback units (420/440/460/480). Preferably, at least one of the sensing units and/or feedback units is "self-powered". For example, the tactile sensor 420 may be a "self-powered" TENG sensor 210.

As illustrated in FIG. 3, the device 200/ring 202 according to one embodiment of the present disclosure integrates one or more TENG sensor (also referred to as a TENG tactile sensor or tactile sensor) 210, one or more temperature sensor (e.g., pyroelectric sensor) 440, one or more vibrators 460, and one or more heaters 480. The ring 202 is configured to augment tactile-perception and haptic feedback with multi-modal sensing and feedback, including vibro- and thermos-haptic feedback. The sensing units (420/440) are preferably selected from various self-powered sensors and/or the feedback units (460/480) are preferably selected from various low-voltage driven feedback elements.

In some embodiments, the ring 202 may be described as having an outer surface 221 and an inner surface 223, with a hole 240 defined by the inner surface 223 for receiving a finger. In preferred embodiments, the TENG sensor/tactile sensor 210 and the heater 480 are disposed on the inner surface 223 of the ring 202, and the vibrator 460 and the temperature sensor 440 are disposed on the outer surface 223 of the ring 202. The device 200 may provide the tactile sensor 210 in abutment with a body part and provide the heater 480 in contact the skin of the user. The temperature sensor 440 is preferably disposed on the device 200 in a location that will naturally come into contact with a part of an object that is held by the user. The vibrator 260 is preferably disposed on the device 200 such that the body part in contact with the device 200 can sense vibration generated by the vibrator 460.

Figure 4D:
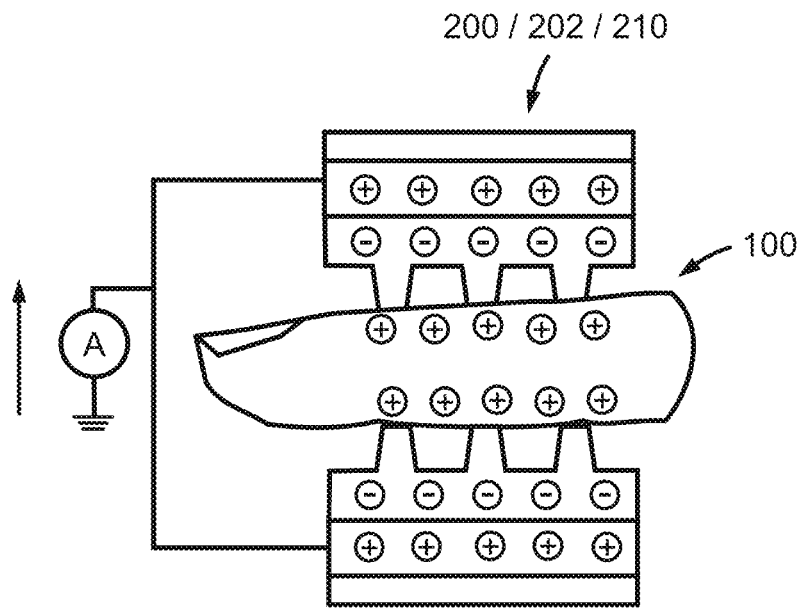

FIGS. 4A to 4E further illustrate the example of the device 200. As shown in FIG. 4A, the device 200 is shaped and sized to receive or be worn on a finger 100 of a user, e.g., in the form of a ring 202 preferably wearable at the middle phalanx, leaving the rest of the finger 100 and the hand 130 uncovered so that any interference with the natural senses and flexibility of the hand 130 is minimal. Although illustrated as a closed ring, examples of the device 200 may include an open ended ring, a loop, a spiral/coil structure, etc. Preferably, the device 200 is shaped and sized to cover only a part of a finger 100, leaving the joint areas free to move and bend. Preferably, the device 200 when worn on a finger also leaves the fingertip exposed for touching, pressing, swiping, and various other tasks. Preferably, a substantial portion of the palm of the hand is also exposed, i.e., not covered by the device 200.

As illustrated in FIG. 4B, the ring 202 includes a triboelectric nanogenerator (TENG) sensor 210 as an example of a tactile sensor. The TENG sensor 210 includes a first layer 211 that can serve as a negative triboelectric material or a negatively chargeable triboelectric material (e.g., a material with a relatively high electron affinity). In some examples, the first layer 211 is a thermoplastic polyurethane (TPU). The ring 202 includes a third layer 213 made of an elastic material. In some examples, the third layer 213 is made of silicone rubber. The TENG sensor 210 includes a second layer 212. The first layer 211 and the third layer 213 are spaced apart or separated by the second layer 212. In some examples, the second layer 212 is a thin film made of an electrical conductor, including but not limited to aluminum (e.g., aluminum film). The second layer 212 is configured to serve as an output electrode of the TENG sensor 210. Preferably, the materials selected for various components of the ring 202 are selected from soft, elastic, or compliant materials. Optionally, the various components may be 3D-printed.

In some examples, the third layer 213 includes a plurality of deformable structures 230 disposed radially or distributed along a perimeter of a hole 204, in which the hole 204 is sized to slip over a finger 100 of the user. As illustrated in one example of FIG. 4C, one example of the deformable structure 230 is a protrusion extending towards the hole 204 by a protrusion length (h). The deformable structure may include a broader base 232 (W1) that tapers towards a narrower end 234 (W2).

Figure 4E:
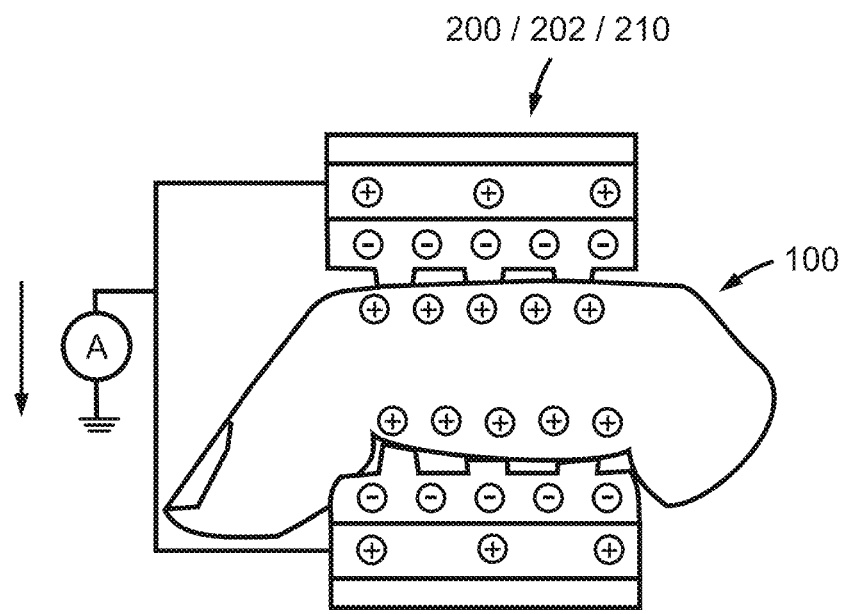

The finger 100 wearing the ring 202 may undergo a variety of different poses 110, e.g., a first pose as illustrated in FIG. 4D, a second pose as illustrated in FIG. 4E, etc. The third layer 213 is in direct physical contact with the finger 100 when the ring 202 is worn. The ring 202 is preferably worn at a position corresponding to a middle phalanx 120 of the finger 100. When the finger 100 is straight (e.g., FIG. 4D), at least a part of the third layer 213 contacts the skin of the user. When the finger 100 is bent (e.g., FIG. 4E), the contracted muscle bulges, pressing against the third layer 213 and generating changes in the triboelectric charges.

In the examples where the third layer 213 includes one or more deformable structures 230, the flexing or change in pose of the finger 100 changes the extent to which the deformable structures 230 are deformed, and changes the contact area between the finger and the deformable structures, resulting in corresponding triboelectric charges. The TENG sensor 210 provides a voltage (also referred to as a load voltage) at the output electrode (in this example, the second layer) of the TENG sensor 210. The pose 100 may also be variously described in terms of one finger 100, collectively in terms of two or more fingers 100, or in terms of one or more hands 130.

A working mechanism of the TENG sensor 210 is based on the coupling of contact electrification and electrostatic induction. When two materials with different electron affinities contact and separate, surface charges will be generated (and retained) on the contact surface due to triboelectrification, which will result in the varying electrical potential in the electrodes, generating a current flow in the external load and the triboelectric outputs.

The skin of the finger will tend to lose surface electrons where the finger contacts the third layer 213. The third layer 213 is made of a material that can serve as a positive triboelectrification layer or a positively chargeable triboelectric layer, e.g., silicone rubber. When the finger bends, the contact area between the skin of the finger and the third layer 213 (and preferably the deformable structures 230 which are also made of silicone rubber) will increase owing to the change in the muscle shape (also referred to as "muscle swelling") at the second phalanx, and result in a change in electrical potential across the output electrodes (the second layer 212) based on the triboelectrification on the contact surfaces. This potential variation further drives the electron flow and generates the electrical signal resulting from electrostatic induction.

Figure 5A:
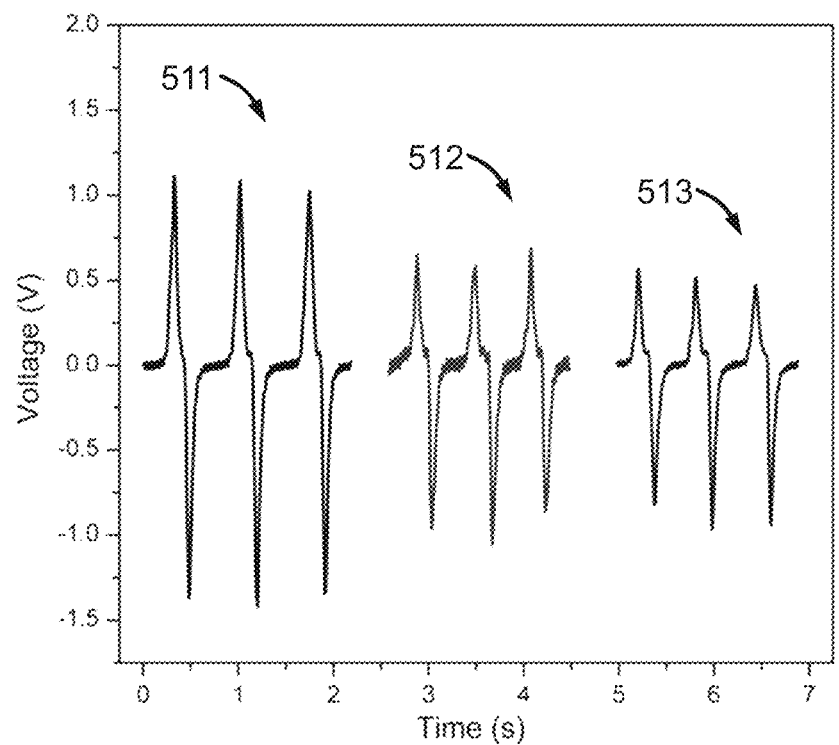
FIGS. 5A to 5C are plots of voltage signals obtainable using various embodiments of the ring.

The TENG sensor/tactile sensor 210 may be variously configured in terms of different dimensions (h/W1/W2) of the deformable structures 230 and ring diameters (d). FIG. 5A shows the voltage readings (Volts) obtainable over time (seconds) for three different TENG sensor prototypes having the same total inner surface area. Plot 511 was obtained using a first TENG sensor characterized by a plurality of deformable structures 230, in which each deformable structure 230 has a base width (W1) of 3 mm (millimeters) and a tip width (W2) of 0.75 mm. Plot 512 was obtained using a second TENG sensor characterized by a plurality of deformable structures 230, in which each deformable structure has a base width (W1) of 2 mm and a tip width (W2) of 0.5 mm. Plot 513 was obtained using a third TENG sensor characterized by a plurality of deformable structures, in which each deformable structure 230 has a base width (W1) of 1.5 mm and a tip width (W2) of 0.375 mm. It was found that the deformable pyramidal structures with the largest pyramid dimensions (W1=3 mm, W2=0.75 mm) and the lowest density of deformable structures 230 (number of deformable structures 230 per unit area of the inner surface 223) can generate the largest voltage readings. The reason for the above phenomenon may be the difference in detecting the concentrated area of the finger muscle deformation. The lower the density of deformable structures 230, the larger area of the major muscle deformation can be covered by the array of deformable structures 230.

Figure 5B:
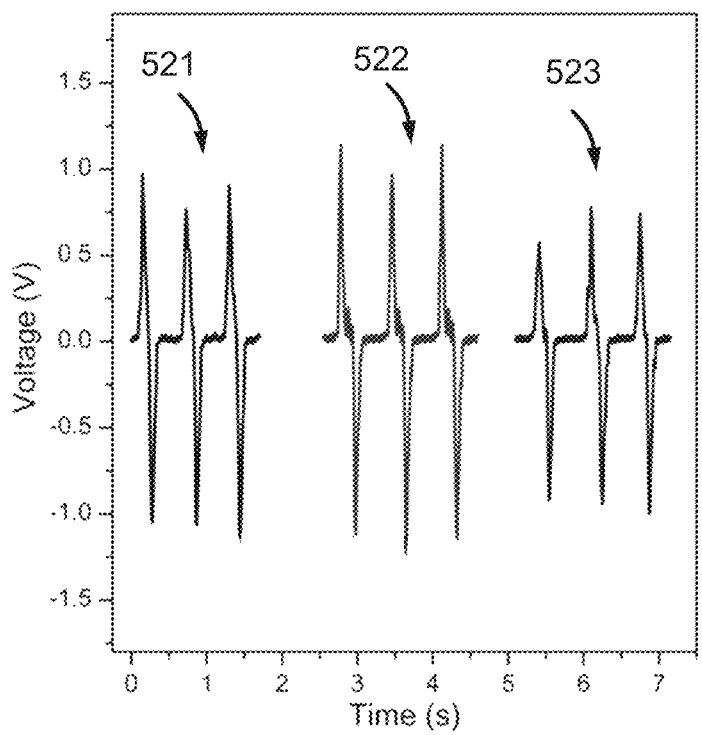

FIG. 5B shows the voltage readings (sensor output) obtainable over time for three different TENG sensor prototypes having the same ring diameter (d) of 20 mm (as measured relative to the outer area 221). Plot 521 was obtained using a first TENG sensor in which each deformable structure 230 has a (undeformed) height (h) of 2 mm. Plot 522 was obtained using a second TENG sensor in which each deformable structure 230 has a height (h) of 3 mm. Plot 523 was obtained using a third TENG sensor in which each deformable structure 230 has a height (h) of 4 mm. The preferred output signal or the largest voltage readings were achieved with a ring diameter (d) of 20 mm and a pyramid height (h) of 3 mm.

Figure 5C:
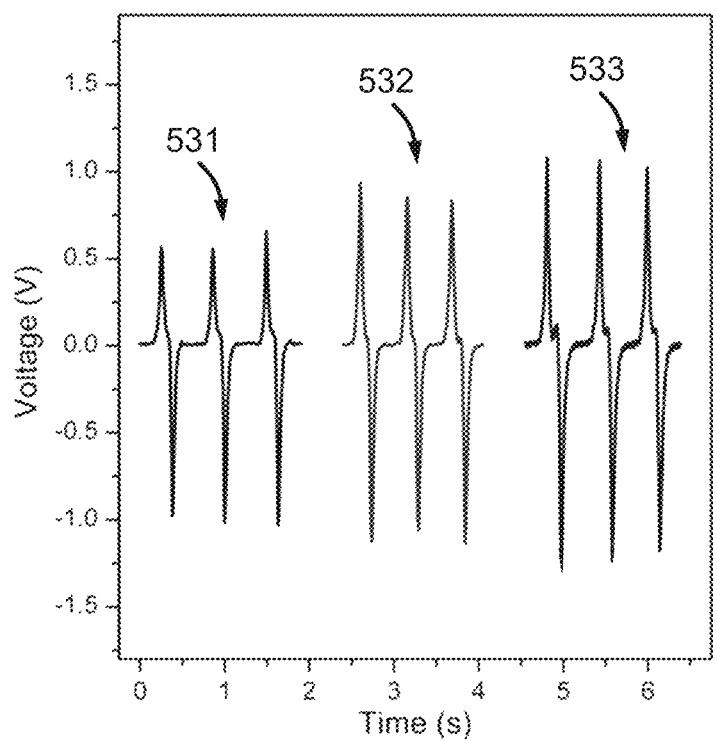

The plots of FIG. 5C show that, for a ring diameter (d) of 22 mm and for the same finger size, the maximum voltage readings (plot 533) can be achieved when the ring diameter (d) is 22 mm and the deformable structure height (h) is 4 mm. Plot 531 and plot 532 were obtained using prototype in which the deformable structure height (h) was 2 mm and 3 mm, respectively.

The experimental results of FIGS. 5A to 5C show that a suitable tightness of fit between the ring 202 and the finger 100 can contribute to a desirable and operable output voltage (sensor output). Considering the differences in human finger sizes in one hand, differentiated ring sizes and deformable structure heights may be customized to the size of each finger 100 of one hand 130.

Figure 6:
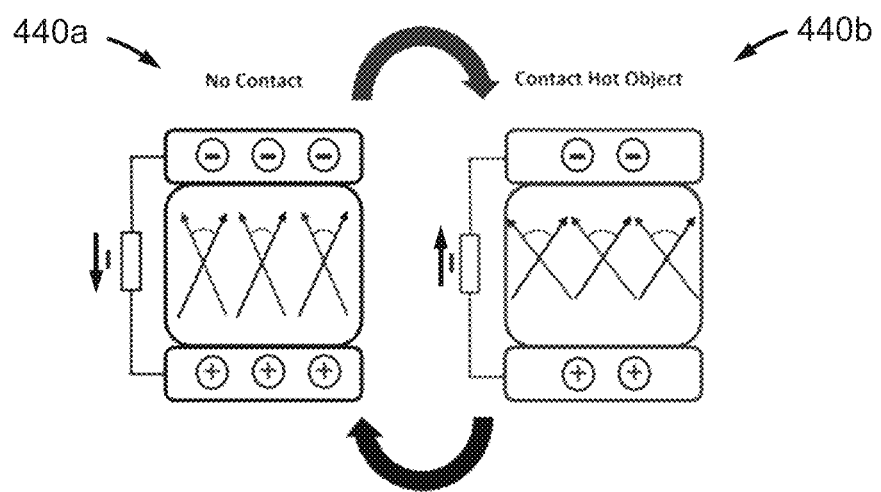
FIG. 6 is a schematic diagram showing an operation of a pyroelectric temperature sensor.

In some embodiments, the device 200/ring 202 further includes a temperature sensor 440. The temperature sensor 440 is preferably attached to the outer surface 221 (FIG. 3) of the ring 202 to measure a temperature of a real object touched by the user in real space. In some preferred embodiments, the temperature sensor 440 is a pyroelectric temperature sensor (also referred to as a pyroelectric nanogenerator temperature sensor or a PyENG temperature sensor). In some examples, the pyroelectric temperature sensor includes a polyvinylidene fluoride (PVDF) sensor. As schematically illustrated in FIG. 6, the pyroelectric temperature sensor 440 includes a pyroelectric material. In response to a change in temperature, the pyroelectric material generates an output signal (sensor output) based on a thermally induced random swing of an electric dipole around its balance axis. When a polarized pyroelectric film contacts with the hot object, the spread of the electric dipoles on their respective alignment axes becomes greater, reducing the spontaneous polarization and resulting in the electron flow due to the electrostatic induction, thus generating the output signal. This output signal (sensor output) is fed to the controller 412 (FIG. 2C).

Preferably, at least one ring 202 in a set of rings 202 worn on a hand includes the temperature sensor 440. For example, the ring 202 440 to be worn on the thumb may have the temperature sensor 440 disposed on the outer surface 221, at a palm-side of the thumb, where the temperature sensor 440 would naturally or be likely contact an object held in the hand.

According to some embodiments, an inner surface 223 of the ring 202 is provided with a NiCr wire/heater 480. A prototype was fabricated by first forming and curing a silicone-based triboelectric layer (the third layer 213). A NiCr metal wire was attached to the area of the silicone rubber surface without the deformable structures 230. The NiCr wire was then covered by an additional mixture of Eco-flex and cured.

A vibro-feedback unit is disposed on the ring. Preferably, the vibrator or vibro-feedback unit 460 is an eccentric rotating mass (ERM) vibrator. Preferably, the vibrator 460 is coupled to the outer surface 221 of the ring 202 (e.g., at the "top" of the ring) and configured to deliver vibrational sensations to the entire finger 100.

Signal Processing Method

Figure 7:
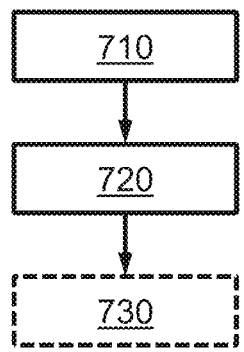
FIG. 7 is a schematic block diagram illustrating a method according to embodiments of the present disclosure.

The controller 412 is preferably configured to perform a method 700 (FIG. 7) of signal processing by executing instructions stored in/on a computer-readable medium, according to various embodiments of the present disclosure. According to embodiments of the present disclosure, the method 700 of signal processing is configured to carry out continuous motion sensing based on signals (sensor output) obtained via the TENG sensor 210. In one aspect, the method 700 of signal processing is based on voltage integration. For example, the method of signal processing is configured to continuously receive and process signals (sensor output) from the one or more TENG sensors over a period of time, in which the signals received correspond to a continuous finger motion detection or finger motion tracking. In some preferred embodiments, the method 700 includes a step 710 of receiving an input signal from a sensor (e.g., a TENG sensor), a step 720 of performing voltage integration of the input signal to generate an output signal. The method 700 may further include a step 730 of using the output signal to configure an object in virtual space.

In a conventional TENG-based strain sensor, the signals generated by the sensor are affected by the bending speed (the rate of change of the bending angle of the sensor). In particular, the amplitude of the voltage signal generated by a TENG sensor would vary with the bending speed. This resulted in the inability of the conventional TENG-based strain sensor to accurately measure the bending angle using voltage values/amplitude of the voltage signal for the purpose of gesture recognition.

In the present system 300 and method 700, the transferred charge Q is taken as a continuous parameter for TENG sensors to reflect the whole stimuli/movement of interest, and proportional to an integrated value of the load voltage:

$$Q = I \cdot t = \int_0^t i(t) dt$$

$$Q = \int_0^t i(t) dt \propto \int_0^t v(t)_{load} dt$$

where i(t) represents the instantaneous current flow through the load, and where $v(t)_{load} = i(t) \cdot R$. Advantageously, the integral value of the load voltage can be directly obtained and calculated by the system 300 without the need for bulky equipment, making it suitable for use in wearable/mobile scenarios.

Figure 8:
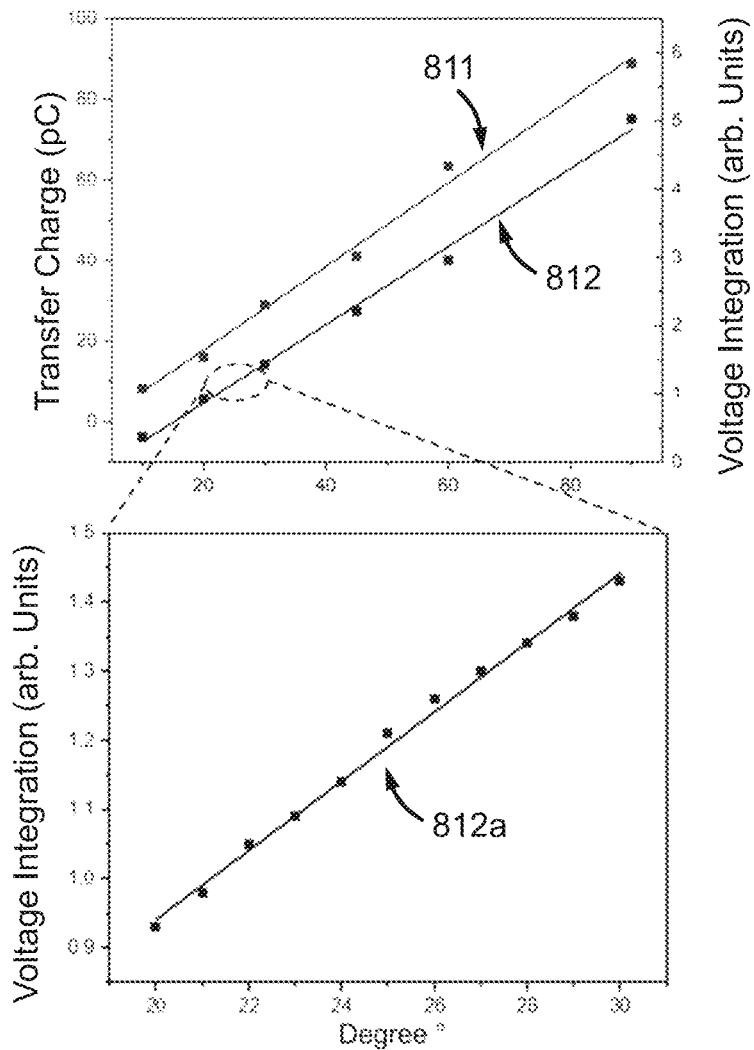
FIG. 8 are plots of transferred charge and corresponding voltage integration over a range of bending angles.

The viability of the proposed method 700 was experimentally verified. FIG. 8 shows a good correspondence between the transferred charge (plot 811) and the voltage integration output (plot 812) of the TENG sensor 210 over a range of finger bending angles. The changing trend of the transferred charge with the bending angle is highly similar to that of the integration value with the bending angle, demonstrating the feasibility of using the voltage integration value to represent the transferred charge for continuous bending detection.

Plot 812a further shows the voltage integration output of the TENG sensor 210 when the bending angle is increased from 20° to 30° at one degree intervals. Advantageously, the voltage integration value was found to be virtually unaffected by the bending speed. It can also be seen that the variation of the bending degree can still be well distinguished, showing the strong perceiving ability of the proposed TENG sensor 210.

Figure 9A:
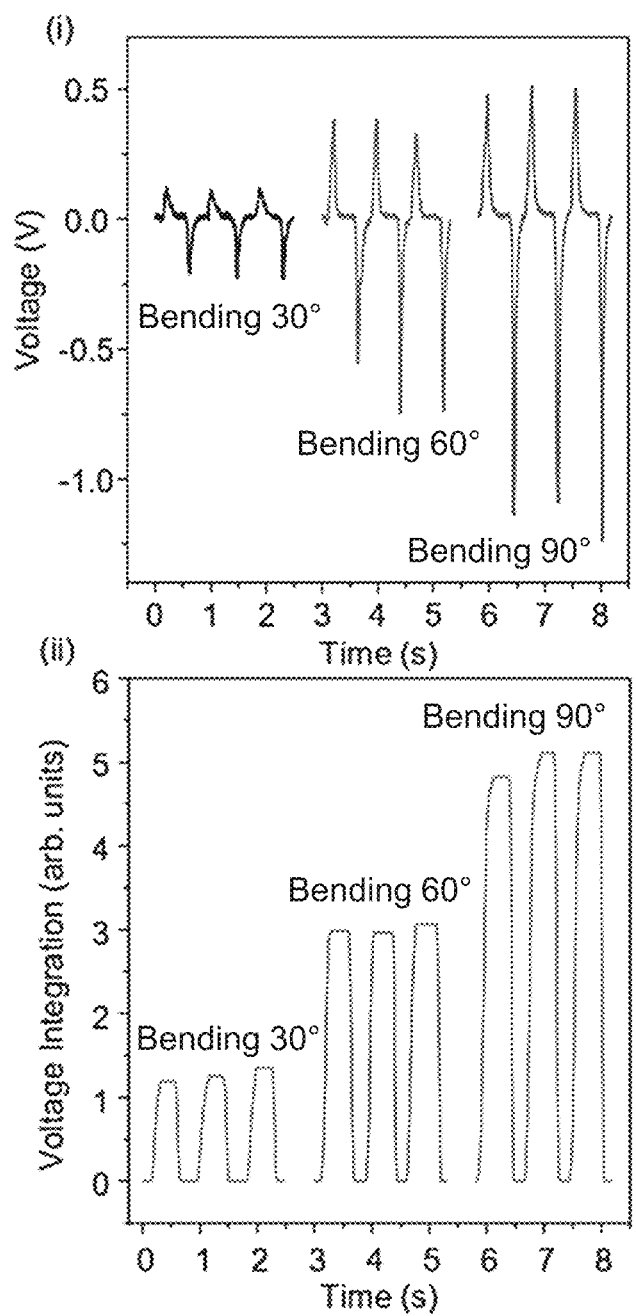
FIG. 9A are plots showing the voltage and voltage integration signals for different bending angles.
Figure 9B:
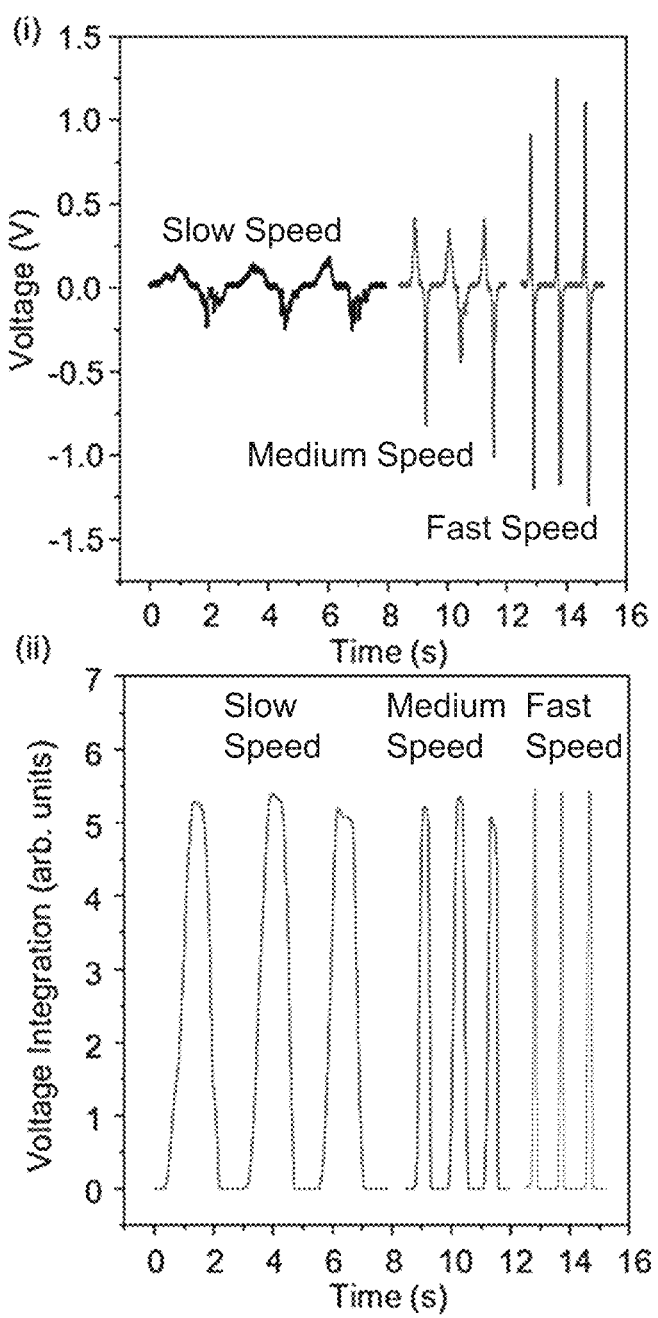
FIG. 9B are plots showing the voltage and voltage integration signals for different bending speeds.

When bending (as an example of a finger movement) occurs at the same speed, as shown in FIG. 9A, it may appear that both the voltage signals and the voltage integration signals can be used to distinguish between bending 30°, 60°, and 90°. However, as shown in FIG. 9B, when the bending angle is the same (in this example, the bending angle was 90° for all plots) and the bending speed varies, the voltage signal varies while the voltage integration signal remains the same. In one aspect, the present method 700 chooses to remove the influence of the rate of change of the finger motion and chooses to extract signal information reflective of a "final" or a "stabilized" pose (which may be described in terms of shape, relative position, orientation, and/or bending angle) of the finger (or collectively, two or more fingers or hand).

Figure 10A:
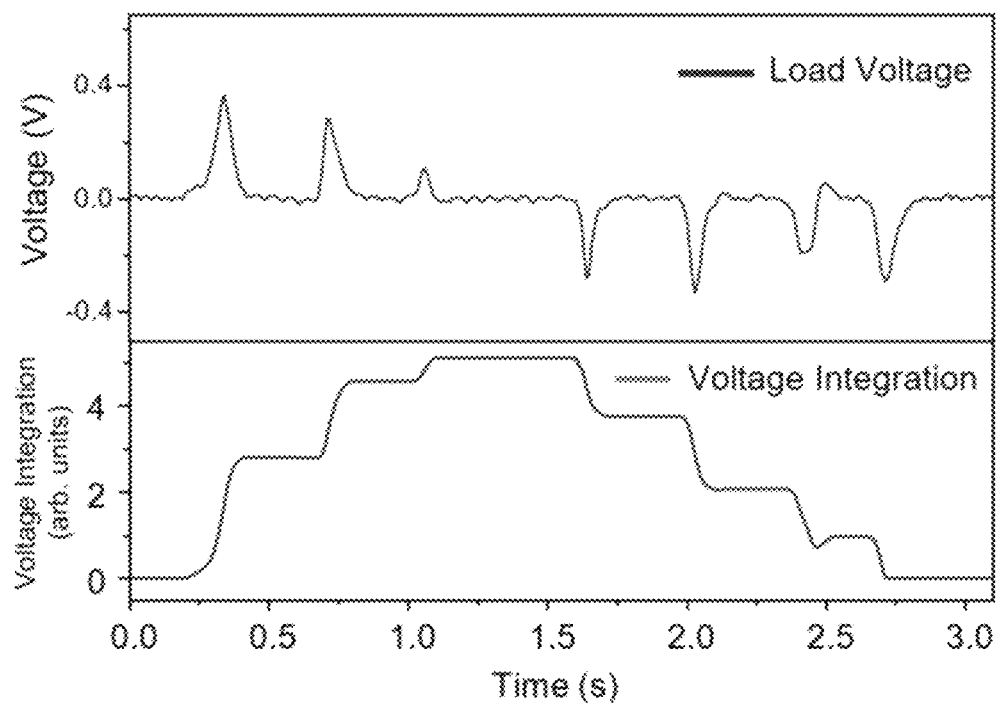
FIGS. 10A and 10B are plots show the voltage and voltage integration over time for different bending motions.
Figure 10B:
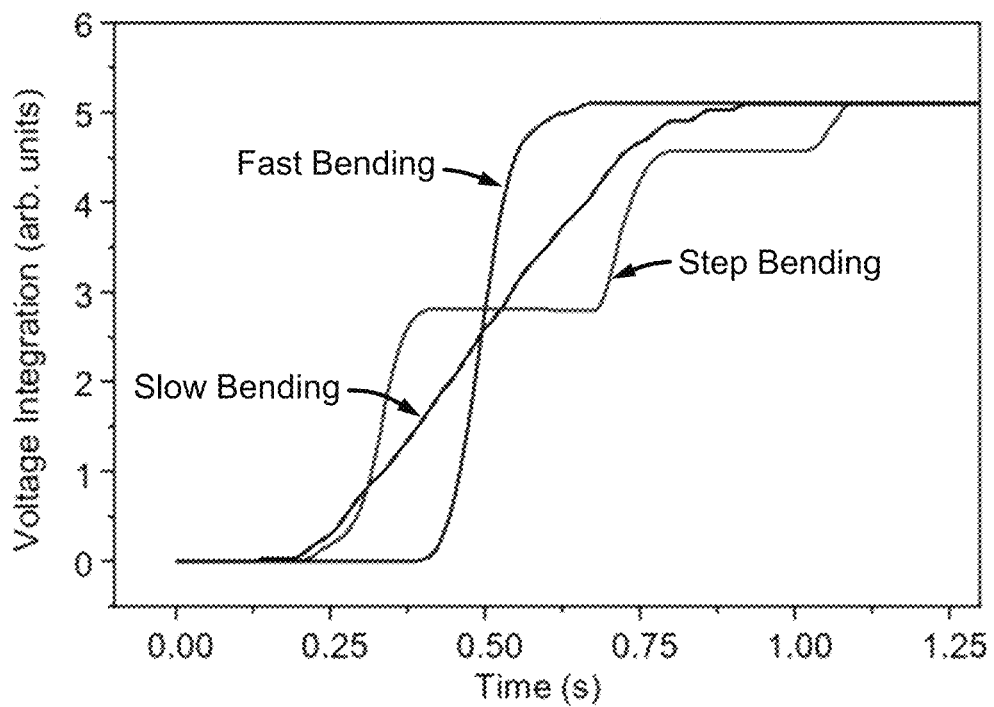

FIGS. 10A and 10B show the capability of the voltage integration method 700 for continuous detection. The load voltage plot of FIG. 10A can only reflect the angle of each step bending, while the voltage integration value curve of FIG. 10B can record the continuous angle change during the whole bending process. By comparing the plots of FIG. 10A with FIG. 10B, the bending speed information can be further extracted from the slope of the voltage integration curves to enable more comprehensive tactile sensing.

Figure 11A:
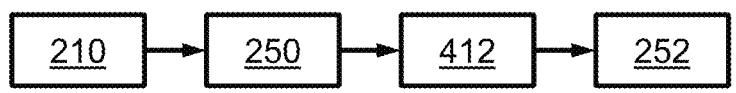
FIG. 11A and FIG. 11B illustrate a system for one hand and the use of the system to control a robotic hand.

FIG. 11A is a schematic diagram showing a prototype system in which five TENG sensors 210 were integrated with 3D-printed soft connectors 250 and a custom IoT module (controller 412 programmed according to embodiments of the present disclosure) 412 for signal collection and transmission. The input signals were collected from a hand of a user and the output signals were used to control finger motions of an advanced manipulator, e.g., the robotic hand shown. The prototype was successfully tested to show real-time and continuous robotic collaborative operation.

Figure 11B:
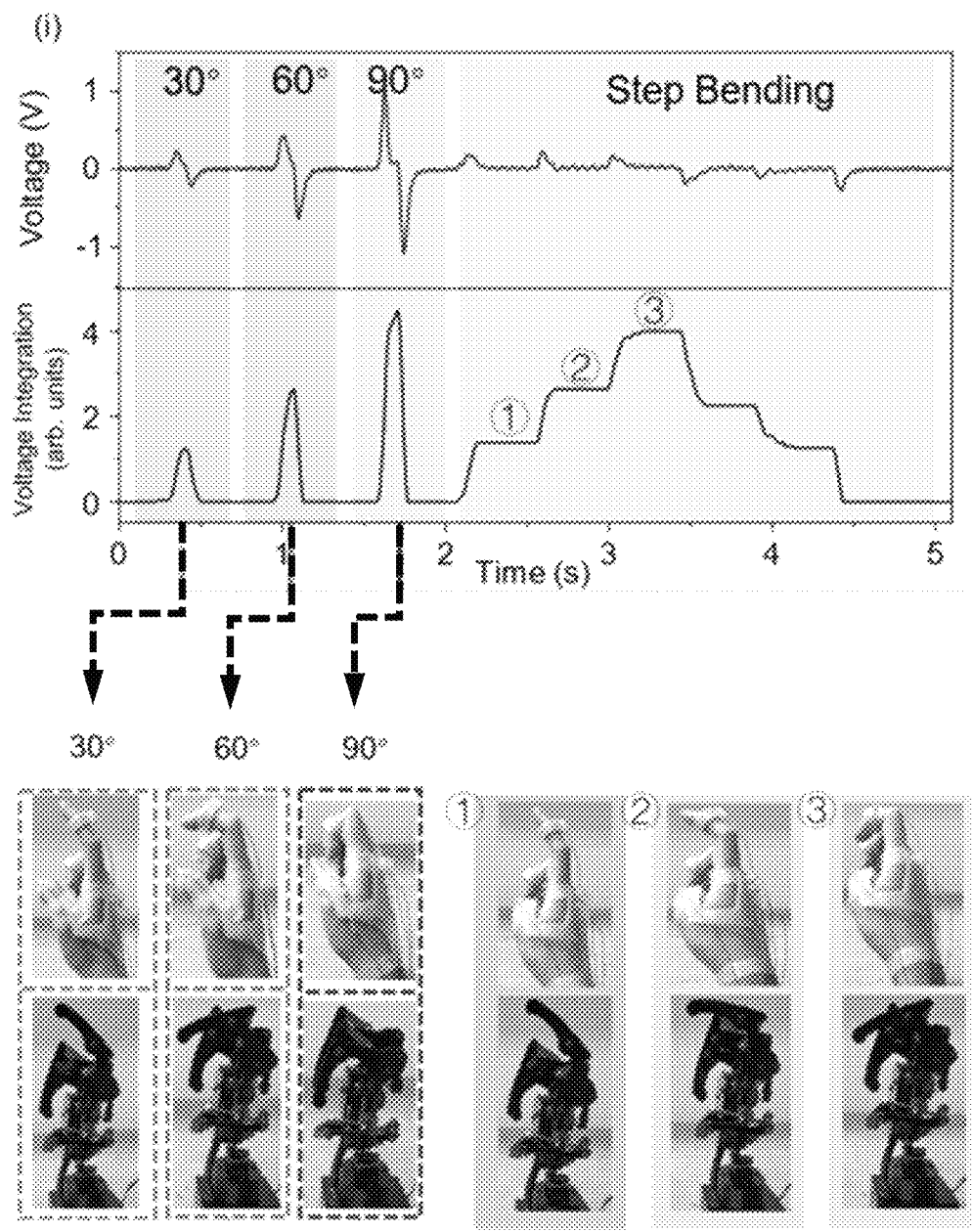

The plots of FIG. 11B show the sensor outputs in terms of the load voltage and the voltage integration, respectively. Between time=0 and time=2 s, the human finger controlled the robotic hand to directly bend a corresponding robotic finger at a large angle (30°, 60°, 90°) and then to release to 0°. The corresponding voltage integration value rises and drops sharply to reflect these instantaneous motions, showing the fast response sensing capability of the control interface.

After time=2 s, the prototype was tested to demonstrate the continuous control capability of the system 300. The robotic finger was controlled to bend at a small angle in each step time period (interval) and held for a while until, step-wise, the bending angle becomes 90°. It can be seen that the corresponding load voltage signal in FIG. 11B could not provide clearly distinguishable values, whereas the voltage integration signal could clearly distinguish between each step-wise change.

Figure 12:
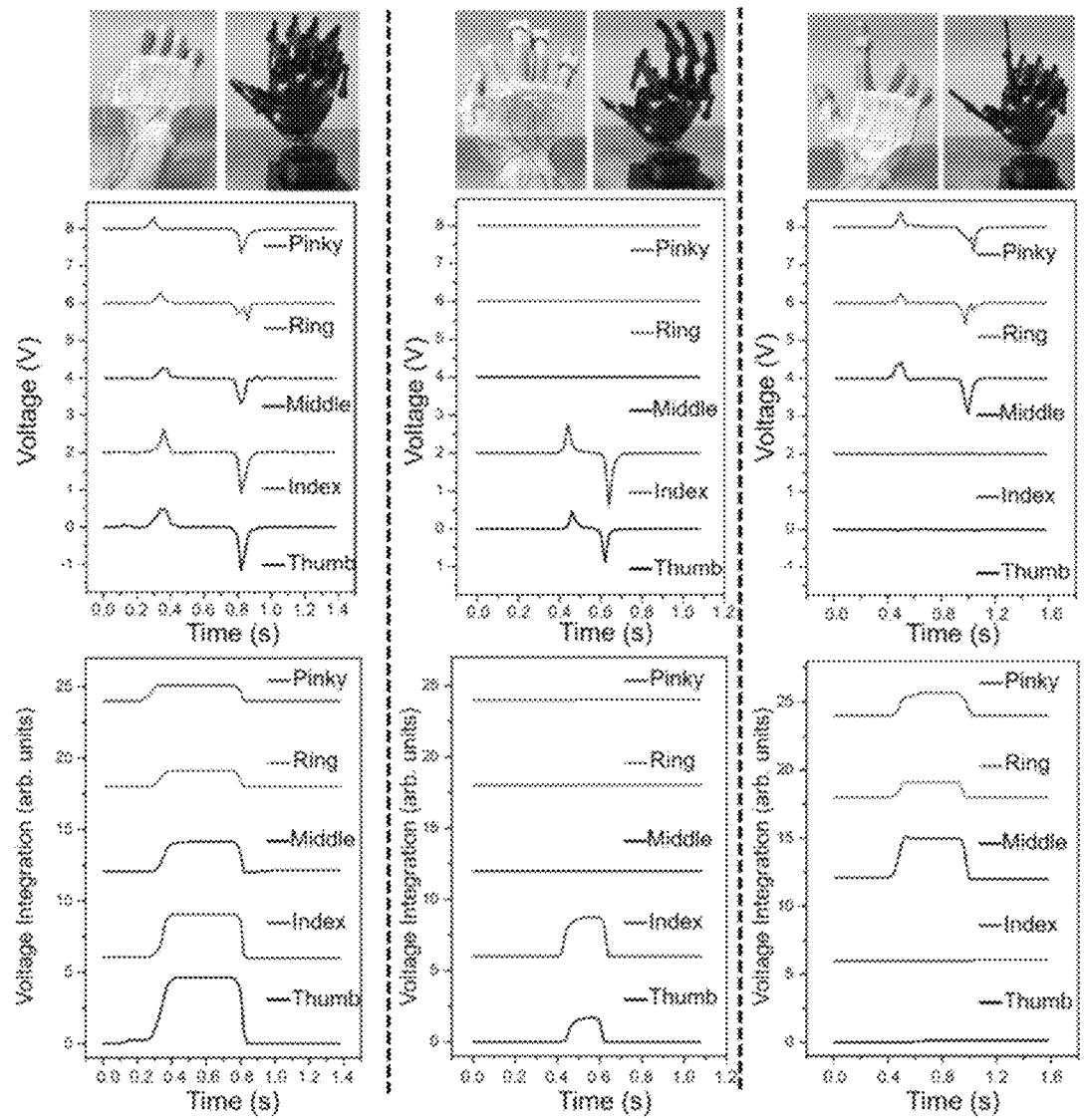
FIG. 12 are the respective voltage and voltage integration curves for each finger (thumb, index, middle, ring, and pink) corresponding to each of three poses of a human hand and the robotic hand controlled by the human hand.

FIG. 12 shows the respective voltage and voltage integration curves for each finger (thumb, index, middle, ring, and pink) corresponding to each of three poses of a human hand and the robotic hand controlled by the human hand. FIG. 12 shows the multi-finger control achieved based on the independent outputs of sensors on each finger. As shown, the present system 300 and method 700 can realize complex gesture manipulation. The corresponding fingers of the robotic hand bent according to the bending fingers of the actual hand, and there is nearly no interference in this multi-channel signal collection process, proving the reliability of this collaborative operation system for complex gesture control for practical usage.

There are various technical limitations associated with the application of the conventional TENG-based strain sensor to gesture recognition. In order for the convention TENG-based strain sensor to achieve continuous tracking, a measuring instrument with an extremely large internal resistance, i.e., an electrometer, is needed to obtain an approximate open-circuit measurement environment to detect the open-circuit voltage or transferred charge quantity. It can be appreciated that the bulky equipment involved in providing the large internal resistance would make the set-up unsuitable for daily use and wearable/portable applications. Another conventional approach is to use a grating-sliding structural sensor to measure the deformation/displacement based on the number of generated peaks. The achievable resolution is limited by the size and spacing of the grating electrodes. Essentially, the measurement method based on the grating-sliding is not completely continuous because it requires the grating electrodes to be arranged intermittently with certain gaps, where the size/spacing of the grating electrodes determines how much information is lost. Even if the size/spacing of the gating can be further reduced with the aid of advanced fabrication processes, the distinguishability of the signal remains a concern. The best resolution could be achieved by a conventional grating-sliding mode TENG sensor for finger motion tracking is only 3.8°.

In contrast, the present system 300 is capable of generating a continuous output corresponding to continuous changes of the muscle contraction/relaxation during various finger motions and achieve a resolution as low as 1°. In other words, the proposed method 700 can reflect this continuous signal change in a portable platform without the need for bulky open-circuit measuring instruments, providing for the first time the ability to realize real continuous measurement of TENG sensor signals on a mobile terminal.

Another advantage of the proposed method 700 is the interpretation capability of continuous gestures. Conventional TENG-based gesture recognition uses the load voltage as the input signal for gesture recognition such that the motion of making a specific gesture will be influenced by the gesture of the previous moment. That is, the conventional TENG-based gesture recognition is based on a relative difference between two consecutive gestures. In some conventional TENG-based gesture recognition methods, the load voltage signal of a whole sentence is analyzed. While the conventional approach seems to take advantage of a context-based gesture recognition, the present disclosure take a different approach to gesture recognition.

According to some embodiments of the present disclosure, the system 300 includes a data set that is based on a single gesture, without the context of the preceding gesture or the sentence. This greatly reduces the cost of collecting gestures as well as the cost of computing. More significantly, it enables universality of the data set for different applications, including but not limited to continuous sign language interpretation.

Normalization/Generalization to Facilitate Adoption

Figure 13:
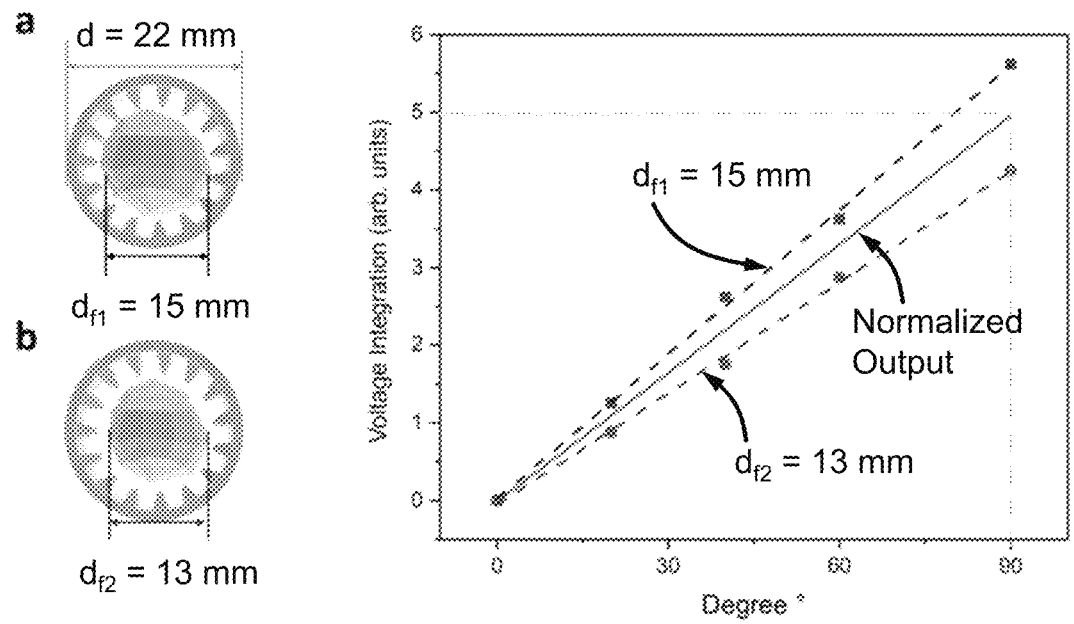
FIG. 13 diagrammatically illustrates a method of calibrating a ring for different fingers.

For actual applications, the user may choose to provide a custom ring size for every finger of every user. A preferred approach is to provide several standard sizes (from small to large). According to some embodiments of the present disclosure, the system 300 may be configured to calibrate the sensor signal using a software/algorithm executable by the controller 412 to enable fingers of different sizes to use rings of the same standard size. Calibration can be performed on demand or on the first use of a device 200/ring 202. As shown in FIG. 13, different finger sizes will result in some variation of sensor sensitivity, given the same size of the ring 202 and deformable structures 230. Advantageously, the present system 300 can be easily and quickly calibrated by taking advantage of the approximately linear relationship between the bending angle and the sensor output. Referring to FIG. 13, a normalized line (sensor output) can be defined as the standard sensor output of the sensor. In calibration, sensor output of different fingers can be converted to the respective calibrated sensor output by applying a calibration factor. Similarly, pulse-like signals can also be normalized based on the sensor output amplitude.

In preferred embodiments, all data, both collected in real-time and stored/retrieved from a database, are normalized. This reduces errors between individuals without negatively influencing the accuracy of gesture recognition. The present method avoids the complexity of hardware calibration. The calibration process only needs to be performed the first time the user uses it and does not affect the ease of use of the device.

Figure 14:
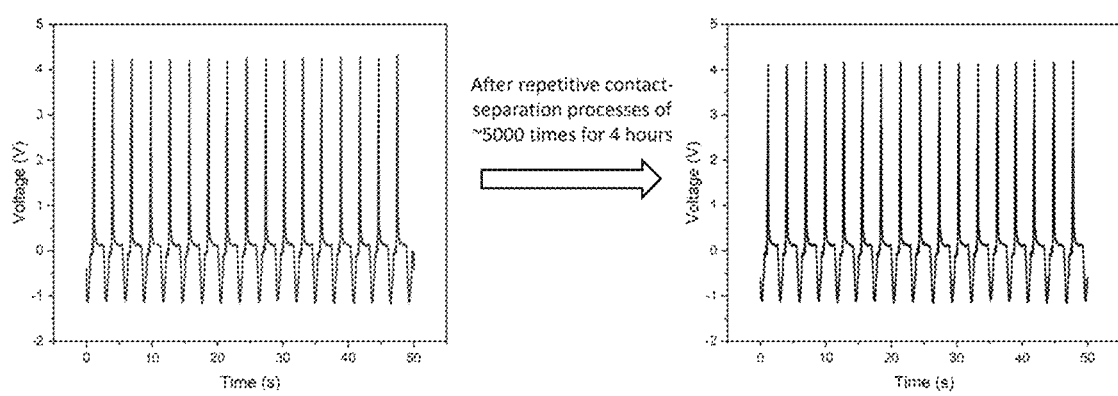
FIG. 14 are plots showing the result of a durability test.

Another aspect to consider in practical implementation is the durability of the TENG sensor 210. The proposed TENG sensor 210 was subjected to a durability test. As shown in the results of FIG. 14, after being subjected to four hours of about 5000 repeated instances of contact-separation at 40 N (Newtons), the voltage signal of the TENG sensor 210 did not show decay. This demonstrates that the proposed TENG sensor is suitable for long-term use.

Yet another practical consideration is the power consumption efficiency of the device 200/ring 202, and of the system 300. Too limited a battery life will hinder adoption of the ring 202 as most users find battery replacement and/or battery charging to be an annoying process. The system 300 can be organized into sensing units and feedback units, and the power consumption efficiency can be considered from three aspects, namely, the sensing units, the vibro-haptic feedback unit, and the thermo-haptic feedback unit.

The sensing units, which include the TENG (tactile) sensor 210 and the PVDF (temperature) sensor 440, are preferably based on nanogenerators that can convert energy from kinetic energy (powered by the human body) or from the ambient environment, into the input signal, and do not need a power supply. Compared to current commercial wearable sensors whose power consumption is in the range of 3-300 μW4, the self-powered sensors in the present system 300 are more energy efficient.

For the thermo-haptic feedback unit, the heater 480 is preferably selected from one or more heating wires, including but not limited to a nichrome (NiCr) wire. In preferred embodiments, the heater 480 is configured to provide a somatosensory temperature close to 55° C. under a power supply voltage of 1.8 V.

Preferably, the sensors are self-powered as described and can be counted as zero-power components, such that the power consumption of the integrated wearable system mainly comes from the signal processing unit/controller 412, wireless data communication module 414, and the haptic feedback units (vibrators 460 and heaters 480). As for machine learning, optimization systems and VR systems, these can be carried out remotely on local terminals or cloud with supercomputing power and does not draw on the battery of the device 200. In such embodiments, the power consumption generated by these functions is less critical to the present wearable system. Considering the maximum power consumption of the actuators in the actual application scenario, the peak overall power consumption can be calculated as 1.95 W, where all vibrators are at maximum vibration intensity and the heater is heated to around 55° C. when attached to the skin. As for the application scenarios that do not need haptic feedback functions, the overall power consumption is around 0.25 W, which is quite low for real-time human-machine interfaces with a high sampling speed as a result of the use of self-powered sensors in the system. Table 1 below shows an exemplary power management configuration for the system 300.

TABLE 1

Power Consumption of Various Units/Components in the System

| | Vibrator | Heater | controller/signal processing unit | wireless/data communication module | Overall |
| --- | --- | --- | --- | --- | --- |
| Number of units | 5 | 1 | 1 | 1 | |
| Power consumption (each unit) | 0.18 W @ maximum vibration intensity | 0.81 W @ 55° C. (skin) | 0.09 W | 0.15 W | 1.95 W (Peak) |

Mutual Interference Among the Feedback/Sensing Units

FIGS. 15A and 15B shows the sensor output of the TENG sensor 210 collected by the controller 412 when the vibrator was not actuated (FIG. 15A) and at maximum vibration intensity (FIG. 15B). It is clear that though the noise density increases a little bit under the maximum vibration intensity, the maximum amplitude of the noise does not change. In some embodiments, the effect of noise is removed with a threshold of the same size without affecting the output of the sensor (sensor output) considering the huge difference in amplitude between the noise (maximum amplitude: 0.005 V) and the valid signal. The interference from the vibration may be ignored in the system 300 in embodiments with an RC filter circuit (low pass filter: <10 Hz) in the signal processing circuit to filter out the hundred-hertz noise from vibrations.

FIGS. 16A to 16C show the influence of temperature changes on the TENG sensor output. In preferred embodiments, the TENG sensor 210 and the heater 480 are integrated into one device 200, with the two sensing units physically spaced apart as illustrated schematically in FIG. 16A. When the heater 480 is heated to more than 70° C., although the sensing area of the TENG sensor 210 may be affected by the temperature due to some heat diffusion, the maximum temperature of the sensing part of the TENG sensor 210 was found to be about 40° C. as shown in FIG.

16B. In daily use, the temperature of the required thermal feedback will not be so high as to burn the finger. FIG. 16C shows the TENG sensor outputs when the temperature of the working environment increases from 25° C. to 45° C. The result shows that the TENG sensor output will not experience significant fluctuation under such working conditions. In other words, the system 300 is configured to balance the temperature changes generated by the heater 480 with the sensor outputs.

Gesture Recognition System and Method

The present system 300 can be applied to recognize gestures, even the recognition of sign languages which would require finer granularity and a sufficiently fast response. The present system 300 and method 700 enables the use of continuous as well as pulsed signals to improve interpretation performance. This is a departure from the conventional gesture/sign language perception system which utilize pulse-like output signals as the input of the learning architecture.

Figure 17:
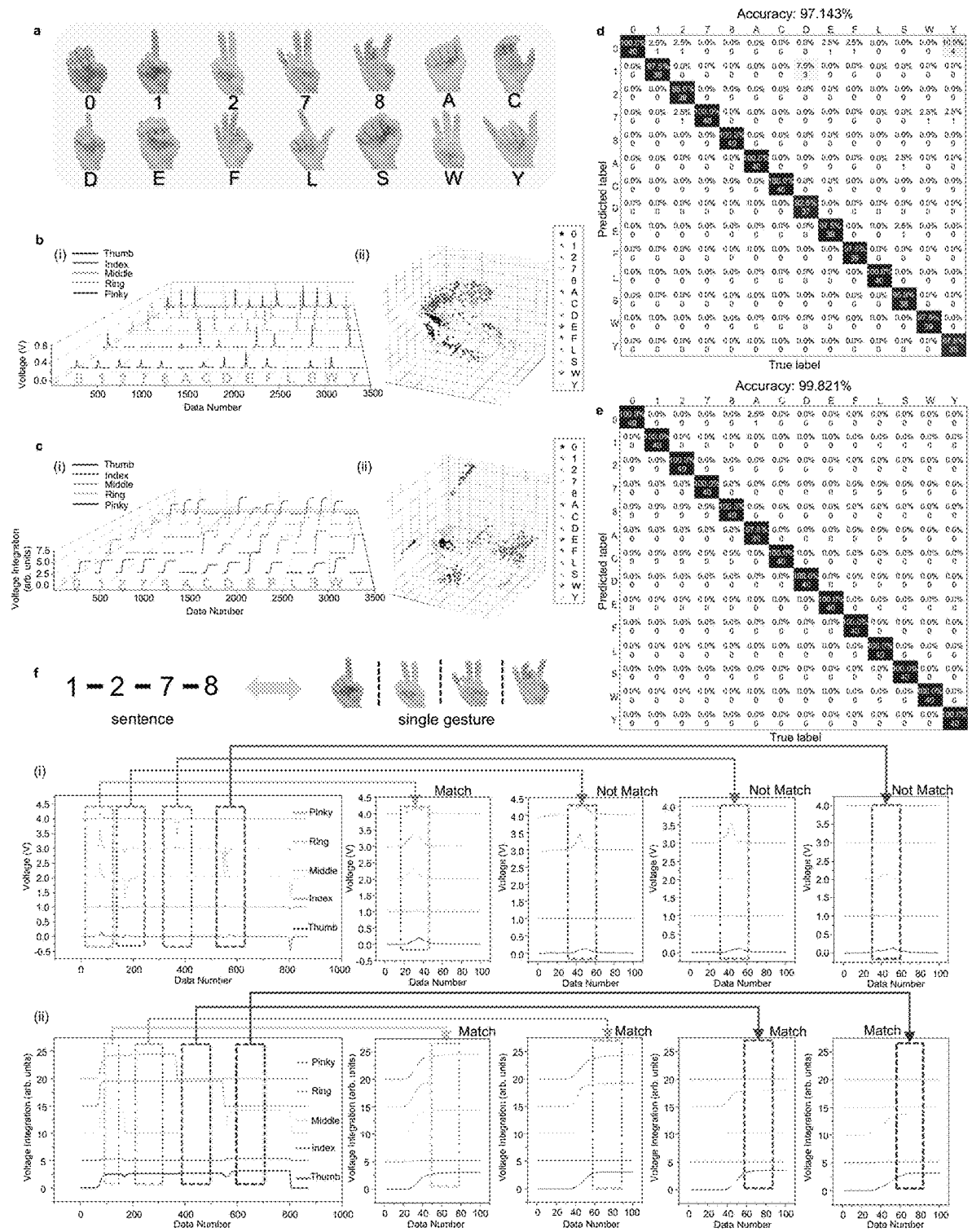
FIG. 17 illustrates an experiment to test the recognition performance of the present system in gesture/sign language recognition.

In an experiment, 14 American sign language gestures were selected, as illustrated in FIG. 17, to test the recognition performance based on the pulse-like signals (FIG. 17b(i)) and voltage integration signals (FIG. 17c(i)), respectively. The normalization process described above was applied during the dataset establishment to address the sensor output differences caused by various finger sizes in one hand or between individuals. This ensures the generalization ability of the system 300 in practical applications. The bending angle of the fingers for each gesture was collected, in terms of the peak values in the pulse-like spectrum or the stable values in the voltage integration spectrum. Each gesture category contained 120 samples, from which 80 samples were selected for use in training and 40 samples were used for testing. By using the principal component analysis (PCA) for feature reduction, the preliminary classification results were visualized in FIG. 17b(ii) and FIG. 17c(ii).

Figure 18:
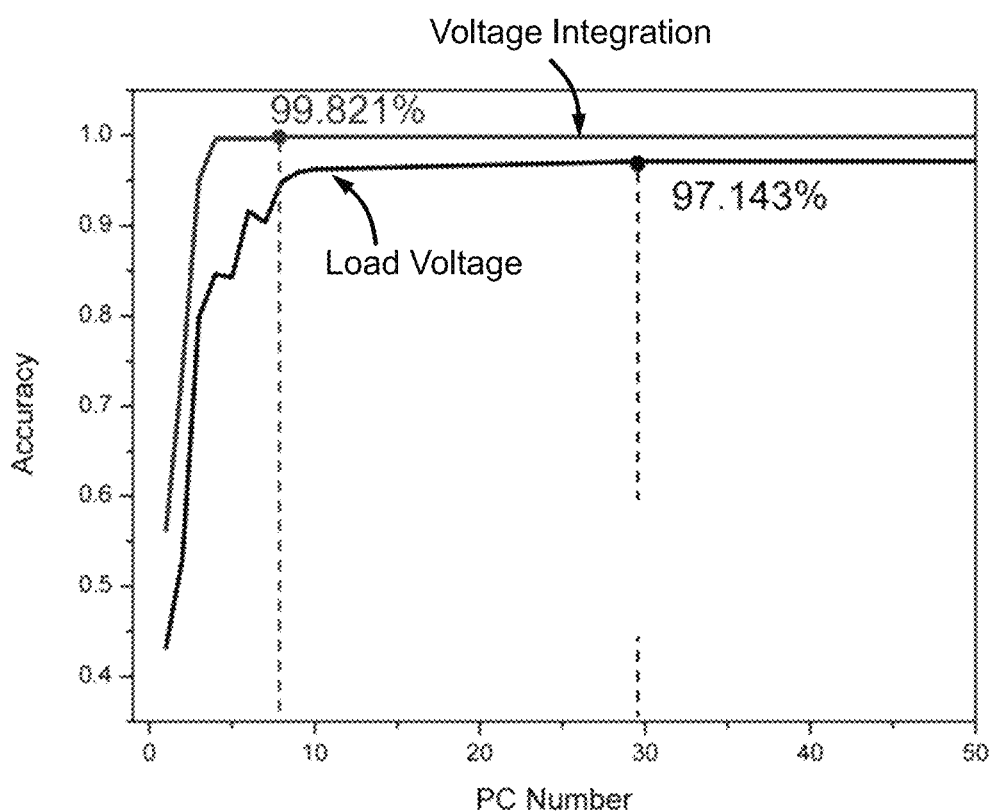
FIG. 18 shows the results of accuracies obtained in the experiment of FIG. 17.

The results clearly demonstrated that an aggregation effect based on the voltage integration signal is better. For the pulse-like signals, many categories may be mixed together, indicating that the three features extracted from the pulse-like output spectrum for distinguishing between different categories may not be as effective as desired. A similar result was achieved when a supporting vector machine (SVM) classifier was applied for further identification. As shown in FIG. 18 the highest accuracy for the voltage integration based dataset reaches 99.821% based on eight principal components, while the highest accuracy for the pulse-like signal based dataset can only reach 97.143%. The corresponding confusion maps showed similar accuracies.

The technical effect of the present method 300 including voltage integration unexpectedly enables significant improvements in more accurate feature recognition. This goes beyond mere data processing to address noise and such issues. It was experimentally verified that the feature differences between different gestures are more obvious after applying the present method 700, which helps the machine learning model to better extract and interpret. In addition, human-induced disturbances, e.g., the influence of the difference in bending speed on the voltage amplitude, are also diminished in the voltage integration signal. When compared to conventional gesture recognition systems, the present system 300 and method 700 can achieve comparable performance with a smaller number of sensor nodes.

The present system 300 is configured to recognize the "final" integration of the voltage output (stabilized voltage integration), i.e., based on the TENG sensor signals corresponding to a meaningful pose of the gesture in the relatively very short time period when the sensor output does not change much. This enables a relatively high accuracy in the identification of sign language gestures.

In addition to the better recognition performance for single gestures, compared to the conventional sign language interpretation systems, the present method 700 with voltage-integration also shows advantages in continuous sign language interpretation. Sign language is typically expressed in sentences or as a series of different gestures, where the action of making a specific gesture will be influenced by the gesture of the previous moment. For example, if the user makes a single gesture for "2", the user needs to bend three fingers: the thumb, the ring finger, and the pinky finger. However, if the gesture for "2" follows the gesture for "1", the user only needs to release (straighten) the middle finger. The motion involved is quite different from the motion of making the single gesture for "2".

The present disclosure recognizes that this effect will result in the difference in the pulse like signal between the single gesture, and the same gesture in a continuous sentence, as shown in FIG. 17f(i). In the present method, the voltage integration is continuous and can be maintained to reflect the state of each finger. The effect of the previous gesture can also be ignored by selecting the final stable value as the gesture signal, as indicated in FIG. 17f(ii). This means that the signal of single gestures can be directly used in a sentence. This feature helps to greatly save the time and labor cost of collecting gestures, and improves the universality of the data set. Based on this, a data set can be built and trained on the basis of only the final stable values of the voltage integration signals. The test result is shown in FIG. 18, where the accuracy of 99.821% is maintained, proving the effectiveness of the present method 700 to maintain performance and provide convenience in continuous sign language interpretation.

Augmented VR Compatible with IoT Platforms

Besides the advanced sensing capability, the haptic feedback functionality of the VR wearable device is also integrated to give users a simulated sensation to enhance the interactive experience in the virtual environment.

Figure 19A:
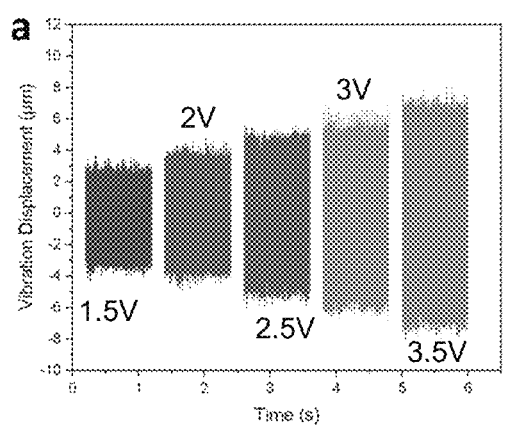
FIGS. 19A and 19B are plots showing an operation of the vibrator 460.
Figure 19B:
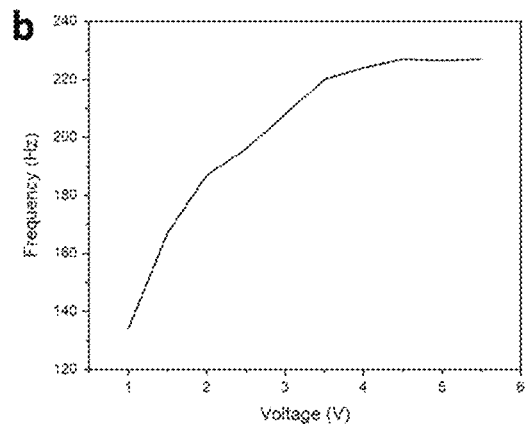

A tactile feedback system with low driven power is realized by integrating a vibrator 460 with the device 200 as described. Preferably, the vibrator 460 is located at the top of the ring 202 on the outer surface 221, spaced apart from the finger by the TENG sensor 210. This delivers vibration to the entire finger considering the limited sensing area of the TENG sensor 210 and integrity of the whole device 200. Although the vibration may be slightly attenuated in this case, it is still strong enough to provide a varying vibration intensity and noticeable difference in haptic information for users to perceive. For the vibro-haptic feedback unit, the vibrator 460 is preferably an eccentric rotating mass (ERM) vibrator or a vibrator that can produce vibrations at different vibration frequencies and/or amplitudes responsive to different supply voltages. Preferably, the vibrator 460 is selected to be one which introduces a sufficiently strong change of feeling for the user. That is, preferably the vibration displacement and the vibration frequency is controllable by controlling the supply voltage to the vibrator 260, as shown in the charts of FIGS. 19A and 19B.

Figure 20A:
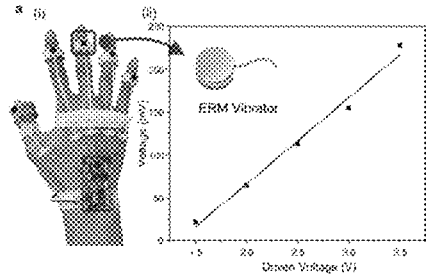
FIG. 20A to 20C and FIG. 21 illustrate an experiment to test the vibro-haptic performance of the system.

To calibrate the vibration amplitude of the vibrator 460, a piezoelectric vibration sensor is utilized, and the measured result is plotted in FIG. 20A (ii). The approximately linear relationship between the driven voltage, sensor output, and the actual vibration amplitude (also see FIGS. 19A and 19B) can help provide adjustable vibration intensity in the actual applications. Besides, as plotted in FIG. 19B, the vibrator 460 changes both the vibration frequency (130-230 Hz) and amplitude under different supply voltages. This feature can help it introduces a stronger change of feeling for users when compared to other vibrators, i.e., linear resonance actuator, piezoelectric actuator, and voice coil actuator operating at a fixed resonant frequency.

Figure 20B:
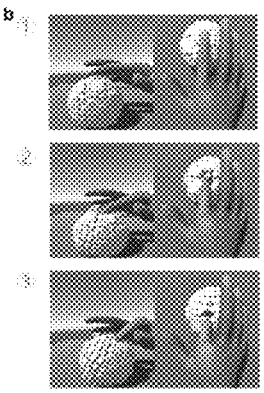
Figure 20B:
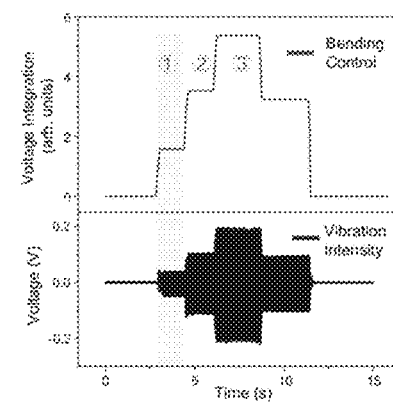
Figure 21:
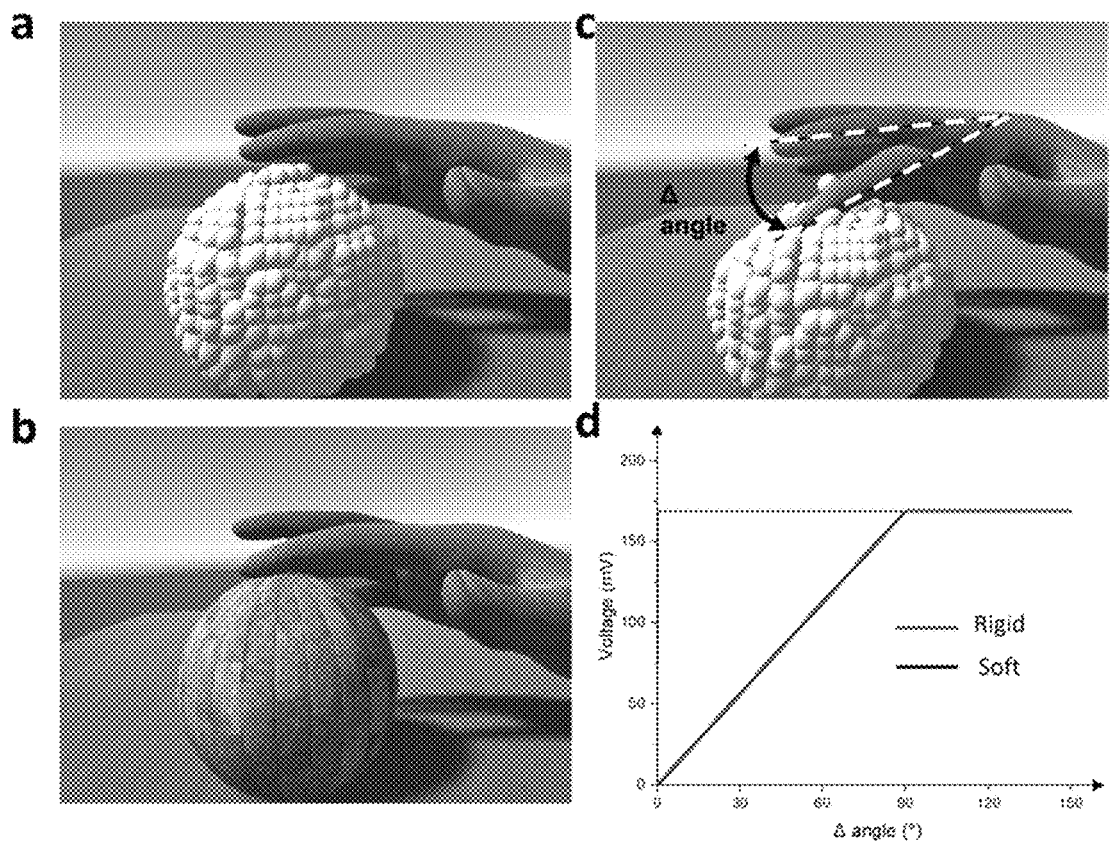

As shown in FIG. 20B and FIG. 21, a virtual hand is controlled to squeeze a soft ball in the virtual world based on the actual bending angle of our finger detected by the TENG sensor. The feedback intensity during this process has three stages. The first stage is that when the finger just touches the soft ball without applying an external force, the amplitude of the vibrator is relatively very small. In the second and third stages, the soft ball is gradually deformed by the human virtual finger. The driven voltage will increase accordingly, so the intensity of the vibration will increase to provide stronger vibro-haptic feedback to simulate the actual feeling of squeezing. Here, the vibration intensity is related to the hardness of the virtual object.

The vibro-haptic feedback unit is preferably configurable to provide different vibration intensities so that the user can sense a difference between a soft virtual object and a rigid virtual object. For pressing the soft object mentioned above, the vibration intensity will increase with the degree of deformation of the soft object, and will reach the maximum when the soft object can no longer be squeezed. However, for pressing rigid objects which are not deformable, the vibration intensity reaches its maximum at the moment of contacting the surface of the object. In addition, the slope of the curve of vibration intensity versus bending angle can be adjusted according to the stiffness of the object, where a larger slope means greater stiffness. Through this kind of control logic and feedback system, the haptic perception of objects under different stiffness could be well mimicked. The controller 412 may be programmed based on different voltage and bending angle relationships to simulate different degrees of rigidity/softness of a virtual object.

Figure 20C:
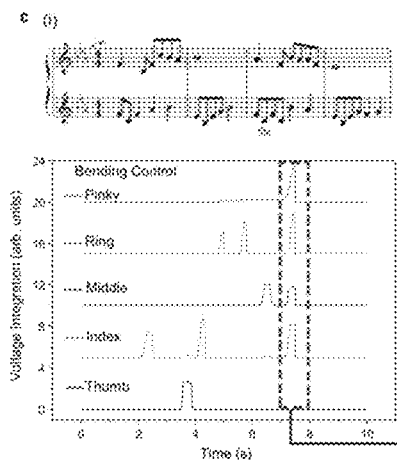
Figure 20C:
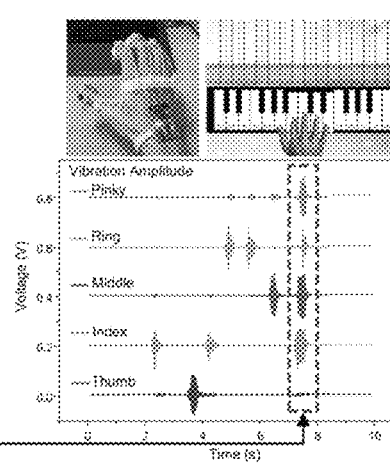
Figure 20C:
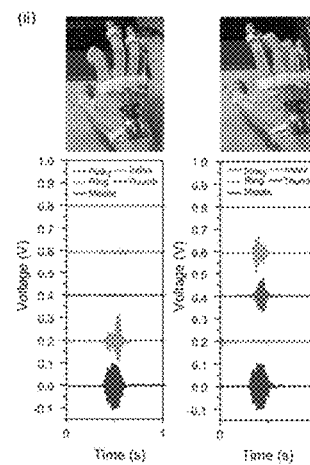

Additionally, the simultaneous multi-finger control and haptic feedback can also be achieved via a VR piano training demonstration in FIG. 20C. The ring on each finger can independently monitor the finger motion for real-time control, and provide specific vibration feedback after receiving the collision signal generated in the virtual space, showing the potential for future virtual educational training applications.

Figure 22:
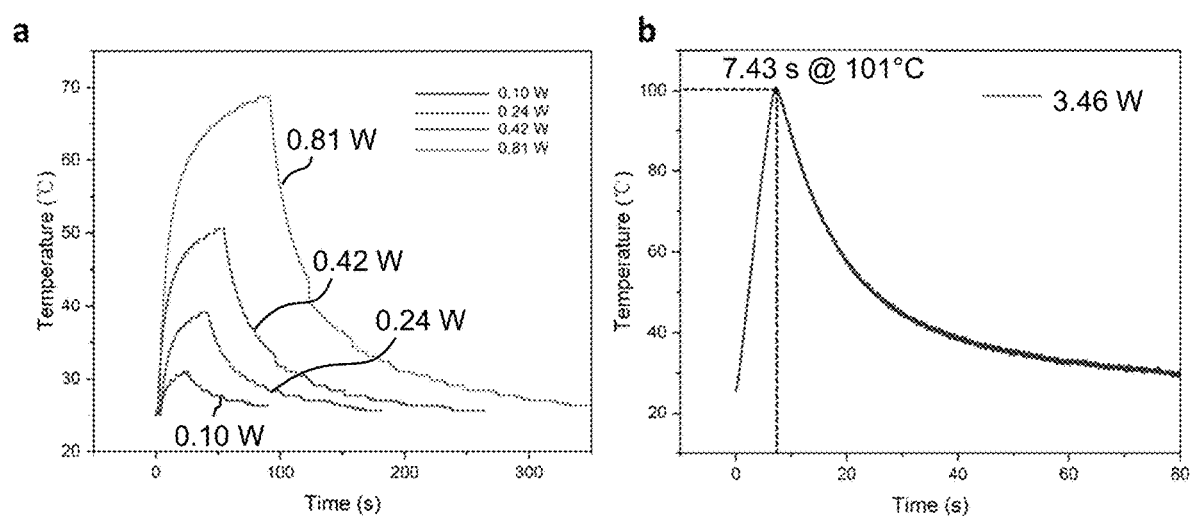
FIG. 22 and FIG. 23 are plots on the response time of heater of the ring taking into consideration mutual influence/interference.
Figure 23:
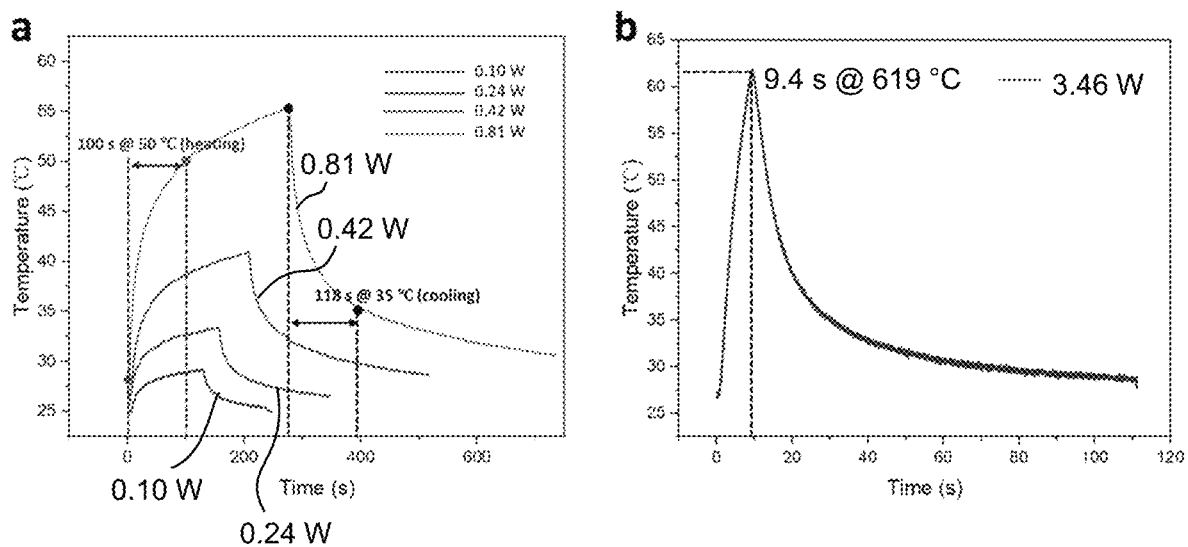

Besides vibro-related feedback, thermo-haptic feedback is also an important function to provide users with a more comprehensive perception of the object. Here, the NiCr metal wire heater is embedded into the TENG tactile sensor as a thermal feedback unit. The relationship between the driven power and the final maintained temperature is also plotted. The response time of the heater (one side contacting a TPU substrate and another side exposed to air) corresponding to different driven power is shown in FIG. 22. A higher driving power achieves a higher stable temperature, but at the same time, it also requires a longer response time. The relatively long response time is caused by the silicone encapsulation effect, but is still acceptable when compared with other related works4. For application scenarios requiring faster response time, another driven strategy could be utilized by first using high power to reach the desired temperature and then lowering the power to maintain the temperature (FIG. 22). However, higher power and longer response time are needed for the heating interface to reach the same temperature in practical applications when the device is in contact with human skin (FIG. 23), where 61.9° C. is achieved within 9.4 s under the maximum output power (~3.5 W) of the IoT platform, which could still meet the requirement of most scenarios considering the suitable perceiving temperature range of the human body.

Figure 20D:
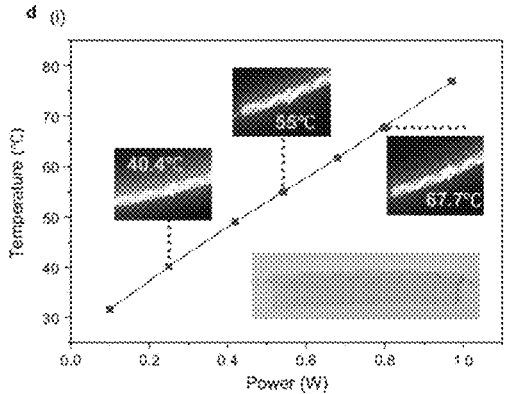
FIG. 20D illustrate an experiment to test the thermo-haptic performance of the system.
Figure 20D:
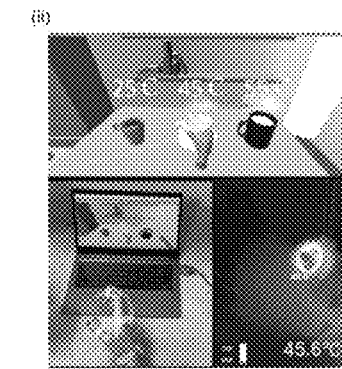
Figure 20D:
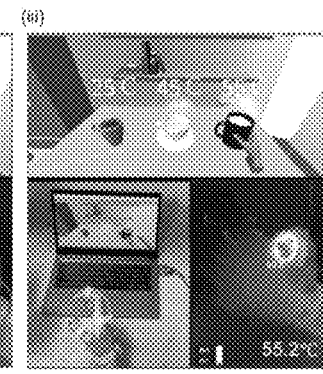
Figure 24A:
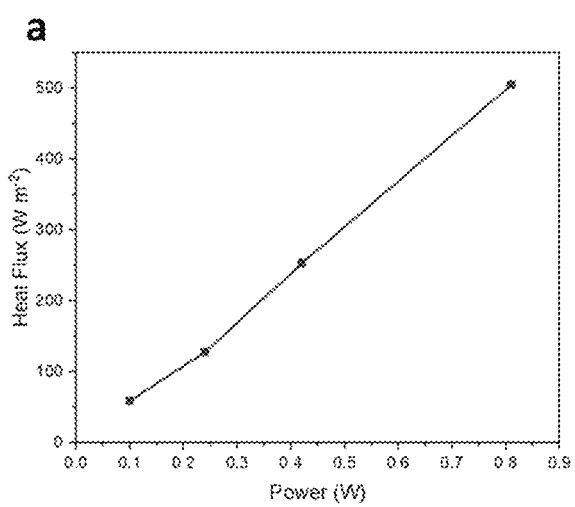
FIG. 24A and FIG. 24B are plots of heat flux of the heater under different operating conditions.
Figure 24B:
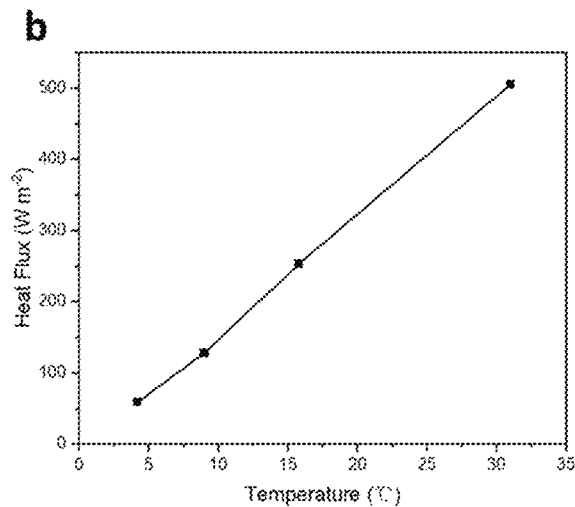

Considering the power consumption of the system 300 and the necessity of the thumb involved in the grasping tasks, we only add one thermo-haptic feedback component to the thumb ring. As illustrated in FIG. 20D (ii-iii), a virtual space with coffee cups of different temperatures is established. A virtual hand can be controlled in real-time by the TENG sensor to grasp the coffee cup first. Then the embedded NiCr heater will be heated up to a specific temperature according to the predefined temperature value of the selected coffee cup. The final stable temperature captured by the infrared camera is almost equal to the preset temperature of the corresponding coffee cup in the virtual space, verifying the temperature feedback capability of the proposed system. Furthermore, heat flux measurement information is also useful to access the temperature sensation. As plotted in FIG. 24A, the heat flux increases with the applied power, and the heat can be easily transferred to the skin under certain supply power. Besides, the approximately linear relationship between the heat flux and the heater temperature (FIG. 24B) enables control of the heat flux simply by controlling the temperature of the heater, which could also be used to mimic various thermal feelings in specific applications, e.g., differentiating objects with different thermal conductivity at the same temperature, etc.

Using the present system 300 for grasping perception in VR space, accurate thermo- and vibro-haptic feedback could be realized simultaneously. As described above, there is nearly no mutual interference between the haptic feedback units and tactile sensor, revealing the possibility of building a fully portable multifunctional sensing and feedback HMI for metaverse applications.

Metaverse Platform

To further enhance the interactive experience, the human sensation from other body parts is also essential for a more comprehensive perception and feedback experience. The proposed ring 202 enables such an augmented VR chat platform. For example, two users can achieve the cross-space perception and sensation attributed to the multimodal sensing and feedback capabilities brought by the system 300. In one exemplary interaction, a first user (wearing the ring 202) grasps an object in real space. The corresponding shape and temperature information could be collected by the ring 202. The system 300 includes a trained machine learning engine and database (e.g., at a cloud server) configured to perform object recognition, based on collected sensory information. The recognition results may be projected to a virtual space in the metaverse that other users can access, e.g., to define/generate a virtual object corresponding to the real space object. In another exemplary interaction, a second user can perform the real time finger control to touch the generated virtual object. The shape and temperature related sensory information can then be feedback to the second user, and used to drive the vibrators and heaters to simulate the real touch sensation in the real space of the second user. As can be appreciated, this is only one of an unlimited variety of examples where virtual interactions can be enriched by the proposed system 300 and method 700. Information sharing over cyberspace is no longer limited to screen sharing or videos which cater to only the visual/auditory senses, and can be enriched by touch and other senses.

The grasped object recognition function may be realized on the basis on the gesture recognition ability of the proposed system 300. For example, object recognition may be realized based on the variation of sensor outputs in finger motion when grasping different objects. To verify the object recognition capability of the ring 202, experiments were conducted to collect the gripping data of five blocks of different shapes/sizes, specifically, a cube, a cylinder, a tri-pyramid, a big ball, and a small ball, with different sizes and shapes. The data set was built by repeating grasping of each object 120 times and collecting the voltage integration signals. The data length for each channel was 300, and the total number of features of each sample was 1500 (with five rings 202 worn on one hand 130). 80 samples out of the 120 samples of each object in the data set were used for training, and the remaining 40 samples were used for testing. The recognition result through a support vector machine (SVM) classifier was analyzed using a confusion map and a recognition accuracy of 94% was achieved. This is a relatively high recognition accuracy, considering that the gestures/pose of the fingers involved in grasping the objects were quite similar for the different objects. The results therefore show the feasibility of using the finger bending information to reflect the grasped object shape.

Figure 25:
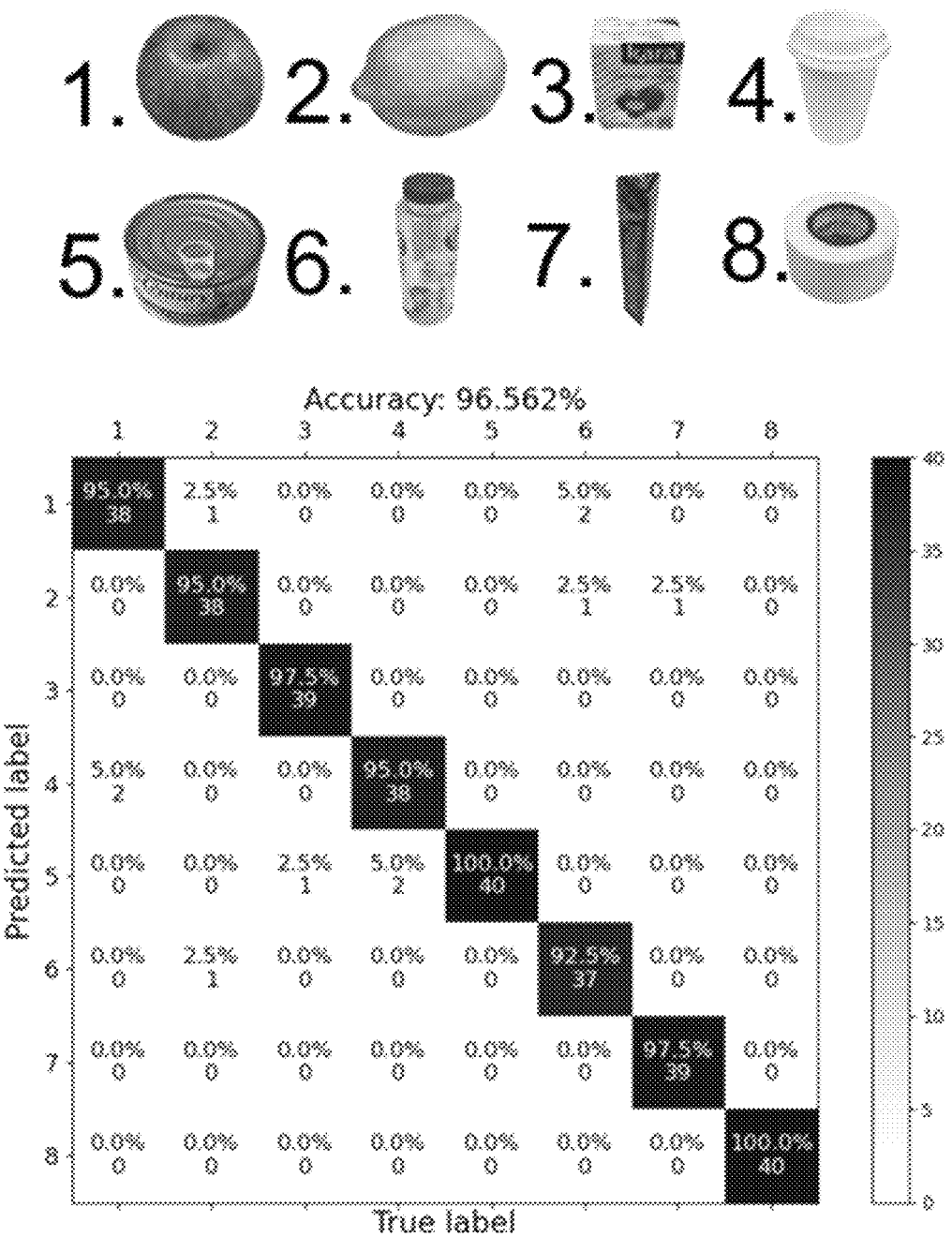
FIG. 25 illustrates an experiment to test object recognition by grasping.

To further investigate the feasibility of the proposed system 300 for actual application, another data set containing eight common daily items was built. The items include the following: (1) an apple, (2) a lemon, (3) a coconut milk carton, (4) a disposable cup, (5) a can of tinned food, (6) a juice bottle, (7) a pack of chocolate, and (8) a roll of duct tape. FIG. 25 shows the general profile of the items and the resulting confusion map. The recognition accuracy achieved is higher than 96% because of greater variability in volume and shape compared with the abovementioned five blocks.

Figure 26:
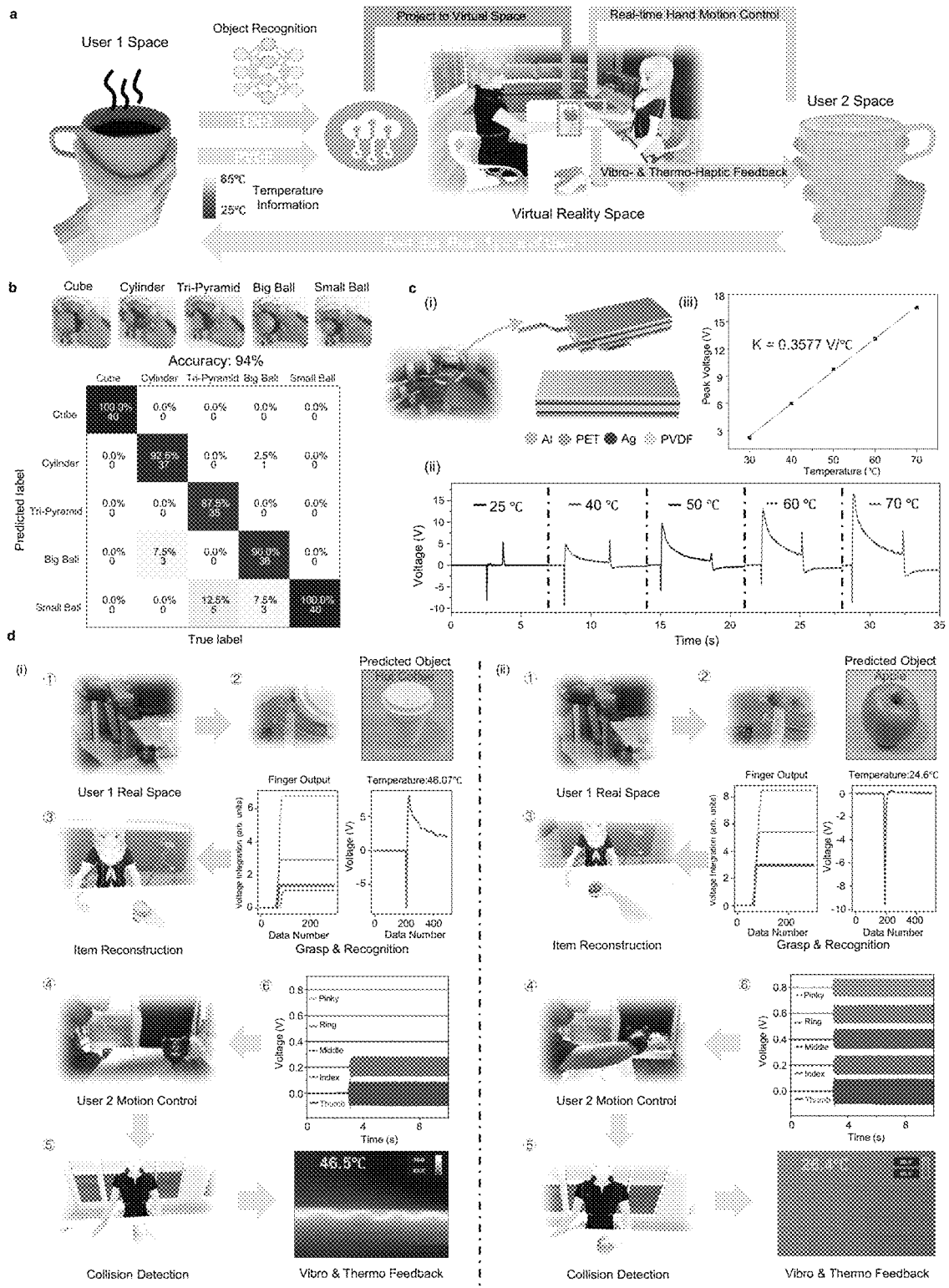
FIG. 26 illustrate the metaverse-related applications of the system.
Figure 27:
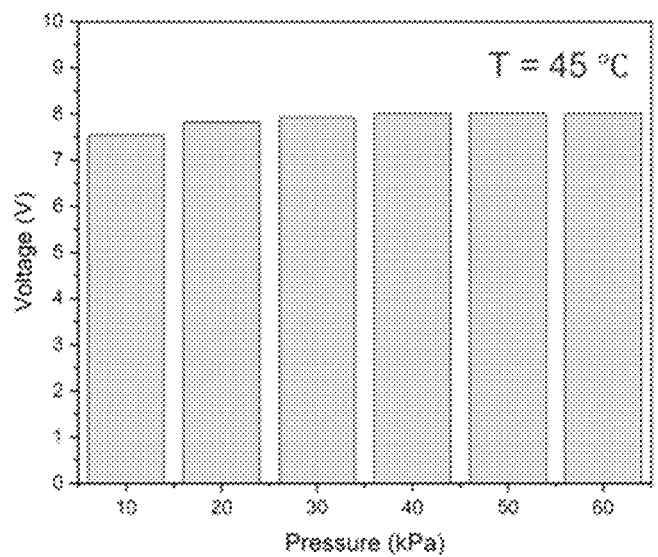
FIG. 27 shows the influence of pressure of temperature sensor.

Besides the shape-related information from the TENG sensors, the temperature sensing function is also important to bring in more comprehensive information in order to enhance the recognition capability. Here, a PVDF temperature sensor with the advantage of self-generated output and high flexibility is utilized. It is integrated with the TENG tactile sensor to form a fully self-powered sensing system. The detailed structure is illustrated in FIG. 26$c(i)$, where a layer of poled PVDF film is covered by the silver output electrodes on both sides. The polyethylene terephthalate (PET) material is utilized for the sensor package, with additional ground electrodes attached to the outer surface to reduce the triboelectricity-induced noise as well as maintain good thermal conductivity. FIG. 26$c(ii)$ shows the output of the PVDF film when in contact with objects under different temperatures at the same contact force. When the temperature of the contacted object is higher than the original temperature of the PVDF sensor, a positive voltage peak is generated due to the greater spread of the electric dipoles on their respective alignment axes in PVDF. Besides, since PVDF material has piezoelectric properties, it also produces a pressure related signal when contacting objects. The pressure-induced signal is a narrow negative peak that appears before the temperature-induced positive peak as shown in FIG. 26$c(ii)$. The influence of pressure on temperature output is also investigated and shown in FIG. 27. When the temperature of the touched object is fixed at 45° C., the temperature-induced output increases slightly from 7.53 V to 8.01 V when the pressure increases from 10 kPa to 40 kPa due to the larger contact area under larger pressure, and saturates when the pressure is larger than 40 kPa. According to the calibration result shown in FIG. 26 $c(iii)$, the error due to the pressure difference in this process is about 1.34° C., which is acceptable in practical applications. FIG. 26 $c(iii)$ also depicts that the pyroelectric peak value is approximately linear in the temperature range of 30° C. to 70° C. and increases with the raised temperature. Hence, it can serve as a reliable reference for object temperature perception. The operation details of the established system are shown in part d of FIG. 26.

It is worth noting that, since the ring 202 is designed for motion capture and feedback for fingers, the positioning of the entire hand in real space is achieved with the help of the HTC tracking system known as "Lighthouse". The trackers and headset use a positional tracking system known as "Lighthouse", where multiple external base station units are installed in the play area, which each contain an array of LED lights, and two infrared lasers. The lasers are attached to rotating spinners which sweep the play area vertically and horizontally with timed pulses. The headset and trackers contain photosensors that detect the LED lights from the base stations, and then compare them with the timing of the laser sweeps in order to determine their relative position in 3D space.

In FIG. 26$d(i)$, a cup of hot coffee is grasped by the first user in the real space. Then based on the collected 5-channel TENG sensor output and PVDF sensor output, the shape information of the grasped object could be extracted by the machine learning analytic and fused with the temperature information to reconstruct the corresponding object in the virtual space, which is also visible to second user in a remote real space. After the first user puts the hot coffee in both the real and virtual space, the second user can control the virtual hand in real time to grasp the reconstructed virtual object. Here, the second user uses the thumb and index finger to grasp the hot coffee. Upon detecting the collision signal in the virtual space, the vibrators and heater will start to operate to provide vibro- and thermo-haptic feedback. The vibration intensity and the feedback temperature could also be monitored and are visualized in FIG. 26$d(i)$, which corresponds to the contact finger channel (thumb and index) and shows high similarity to the temperature value obtained by the infrared sensor from the first user, verifying the multimodal sensing and feedback capability of the proposed system. As a result, the cross-space perception and sensation function could be achieved to help the user to feel the actual space of others. Similarly, the corresponding sensing and feedback result of grasping a room-temperature apple is shown in FIG. 26$d(ii)$, and the obtained result further demonstrates the ability of the ATH-Ring to perceive different objects and provide diversified feedback. The good power efficiency and relatively fast response of the system 300 also ensure a good user experience. The interactive perception of the real world and the virtual world enabled by the ATH-Ring 202 can give people a face-to-face like immersive chat experience, showing good development prospects for metaverse based social connections.

Response Time of the Multimodal Sensing and Feedback Platform

Figure 28A:
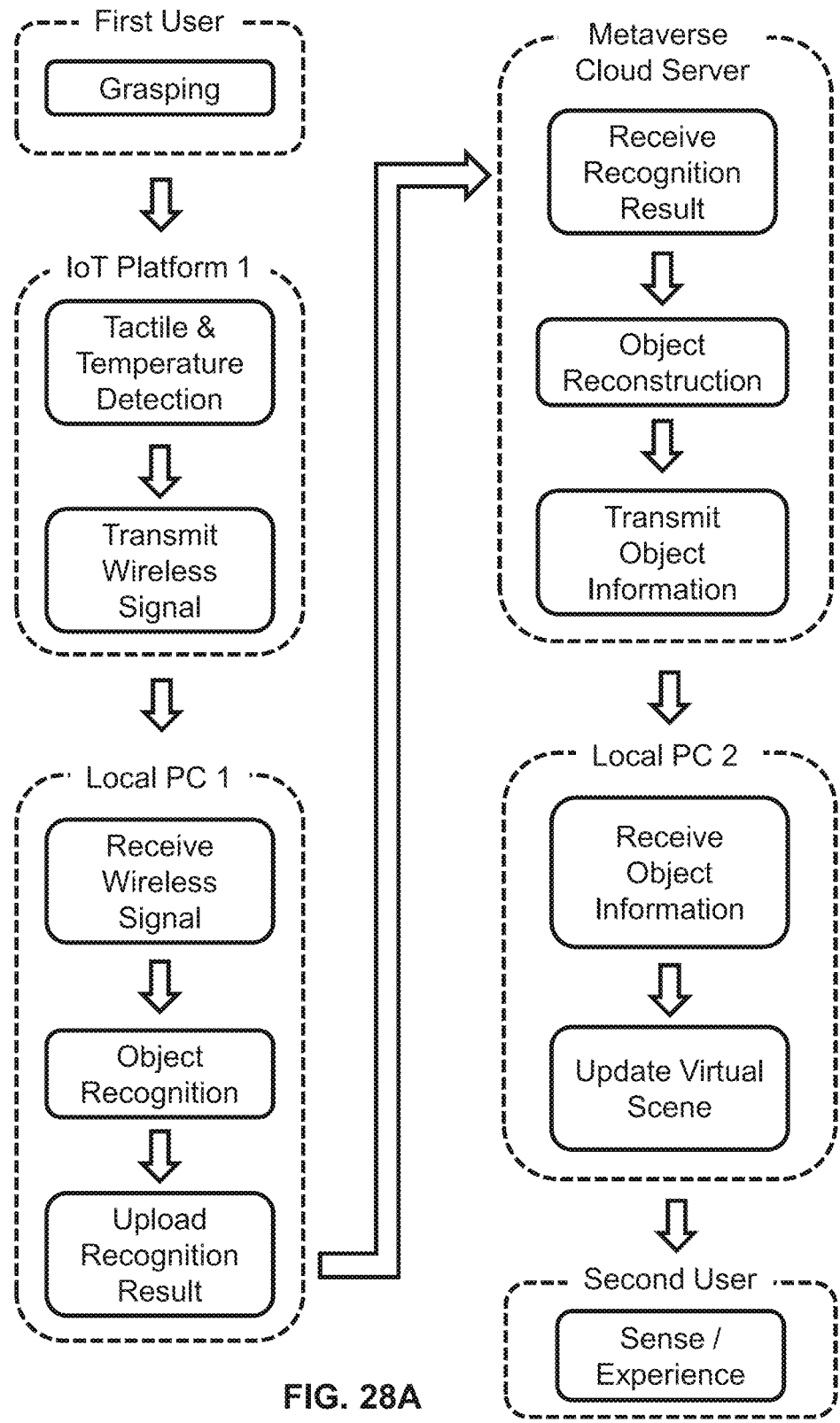
FIG. 28A and FIG. 28B schematically illustrate object recognition and real-time control and haptic feedback processes of the system.
Figure 28B:
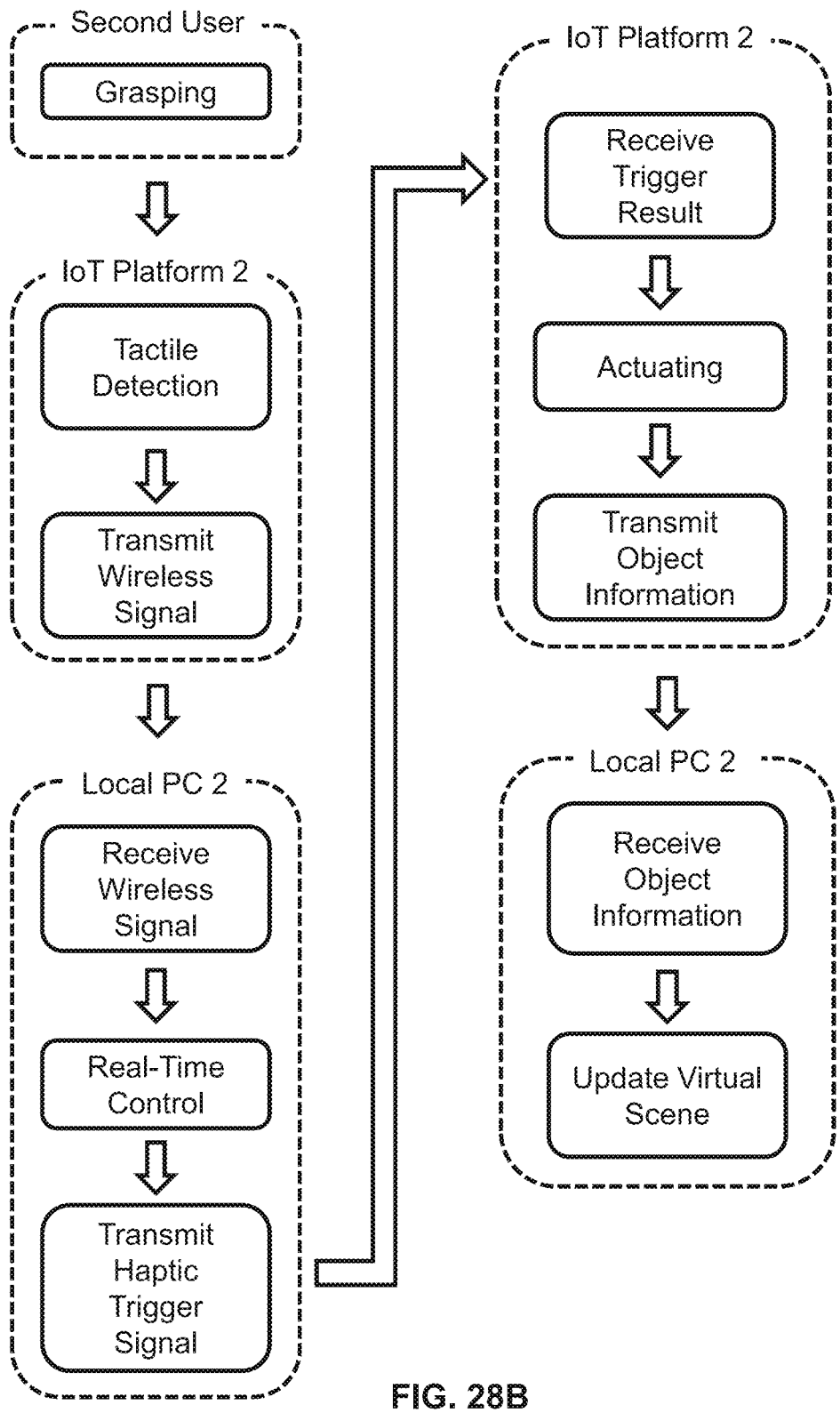
Figure 29A:
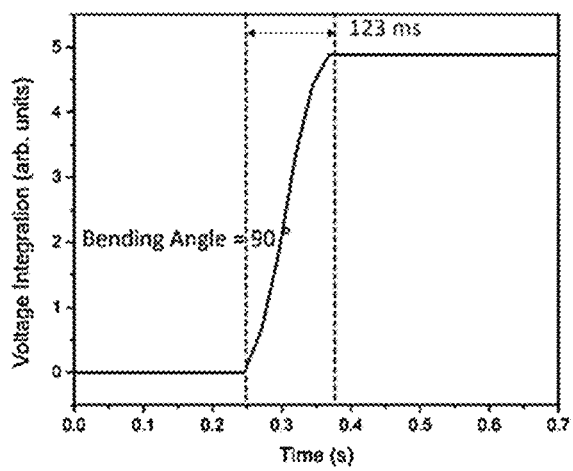
FIG. 29A to FIG. 29C are plots showing the response times in the processes of FIGS. 28A and/or FIG. 28B.
Figure 29B:
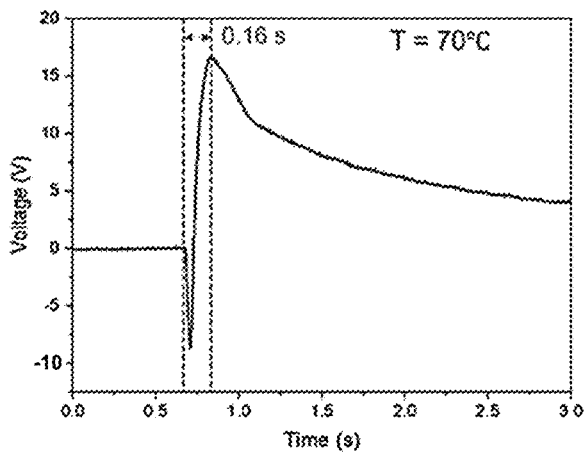
Figure 29C:
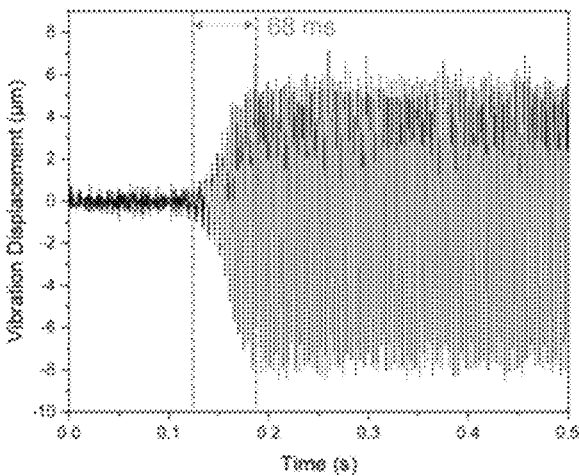

In the metaverse-based interactive system depicted in FIG. 26$a$, the response process can be divided into two parts. One is the object recognition part (FIG. 28A), where the object in the real space of a user could be projected into the virtual space on the cloud through the collected sensor signals and machine learning. Another is the real-time control and haptic feedback part (FIG. 28B), where the user can control the motion of the virtual hand in the metaverse space and feel the virtual object via the vibro- and thermo-haptic feedback functions. The process of the object recognition part includes the acquisition of tactile and temperature signals when grasping objects, the wireless transmission in the local area network, the real-time object recognition based on machine learning, and the communication with the server. Based on the response time of the respective components (FIGS. 29A to 29C and Table 2 below), the response time of the signal acquisition process may be determined by the PVDF sensor due to its comparatively longer response time.

TABLE 2

Response Time of Various Units/Components in the System

| Unit | Response Time |
| --- | --- |
| TENG sensor | 123 ms @ Fast bending 90 degrees |
| PVDF sensor | 160 ms @ 70° C. |
| Vibrator | 68 ms |
| Heater | 9 s @ 60° C. (skin) |
| Wireless Transmission | 4.8 ms |
| Machine Learning Recognition | ~1 ms |
| Cloud Server | 5 ms |

The total response time of the object recognition part (FIG. 28A) can be calculated as ~176 ms. While for the real-time control and haptic feedback part shown in FIG. 28B, the whole process contains the acquisition of tactile signals, the wireless transmissions in the local area network twice, and the actuation of vibro- and thermo-haptic feedback units, where the response time of the feedback actuation process is mainly determined by the heater. Because the response time of the heater is determined by the driving power and the maximum temperature to be reached. Therefore, in the case of the highest driving power of the platform, and considering the temperature (<60° C.) to be reached in practical applications, the ideal response time of the real-time control and haptic feedback part could be calculated as ~9.13 s. If we combine these two parts into an interactive system, the time for a complete interaction is ~9.3 s, which is acceptable considering the generally long response time of the thermal feedback function.

Further Details of the Experiments Conducted

In the experiments, the signal outputs in the characterization of the TENG/PVDF sensor were measured by an oscilloscope (DSOX3034A, Agilent) using a high impedance probe of 100 MΩ. The transfer charge was conducted by an electrometer (Model 6514, Keithley) and the signals were displayed and recorded by the oscilloscope. Analog voltage signals generated in TENG/PVDF sensors and the voltage integration signals for IoT applications were collected by the customized hardware circuit consisting of an ADC, an MCU and a wireless transmission module.

In the experiments, the heating temperature of the nichrome heater in thermo-haptic feedback related demonstration was measured by an infrared (IR) camera (FLIR One Pro). The response time profile of the heater when placed on a TPU substrate with another side exposed to the air was collected by the IR camera. The response time profile of the heater when placed on a TPU substrate with another side in contact with the skin was measured by a 100 k Ohm thermistor sandwiched between the skin and the heating surface. The heat flux information was achieved by using a commercial heat flux sensor (FluxTeq) with the heater sandwiched between a TPU substrate and a heat flux sensor under a finger press.

In the experiments, the vibration amplitude of the vibrators was calibrated by a piezoelectric vibration sensor, and visualized by an oscilloscope (DSOX3034A, Agilent). The actual vibration displacement and frequency were collected by fixing a vibrator on a TPU ring and measuring via a laser vibrometer (VIB-A-510, Polytec). Machine learning enabled by PCA and SVM Principal component analysis (PCA) was used to reduce the dimensionality of each data, while preserving the features that best reflect the variability of the data, in order to better distinguish data from different categories. The analysis was performed via the PCA module available in Scikit-learn library in Python 3.9 environment. The first three principal components were used to display 3D scatter plots of the features. After the dimensionality reduction process via PCA, a support vector machine (SVM) classifier was applied for further classification. The SVM classifier is also available in Scikit-learn library. In both the gesture recognition and object recognition data analysis, the SVM classifier was trained with the linear kernel and set C parameter (penalty parameter of the error term) as 1.0.

The above describes various non-limiting examples and embodiments to aid understanding. It is not possible to itemize all applications and technical benefits of the present method and system. Nevertheless, it can be understood from the description above that the present disclosure provides a viable and practical solution to enable somatosensory sensation for more immersive VR and metaverse applications, based on a highly integrated ATH-Ring with multimodal sensing (tactile and temperature sensing) and feedback (vibro- and thermo-haptic feedback) capabilities. The functionalities may be implemented on a minimalistic designed ring and driven by a custom IoT module (controller configured as described above), demonstrating a high degree of integration and portability. The self-powered sensing features of the TENG and PVDF sensors could be integrated to further reduce the power consumption of the whole system to enable a sustainable wearable manipulator under the IoT framework. The proposed novel signal processing method based on the voltage integration provides the possibility to realize continuous motion detection with TENG sensors on mobile platforms, and also contributes to higher-accuracy gesture recognition, i.e., 99.821% for sign language gestures, when leveraging the ML data analytics. The voltage-integration approach also shows advantages in continuous sign language interpretation by eliminating the discrepancy of signals between the single gesture and the corresponding gesture in consecutive sentences. Furthermore, by utilizing the sensor signal to trigger the integrated vibrators and heaters, adjustable vibro- and thermo-haptic feedback is achieved to simulate the sensation of touching objects in the virtual space. Based on this AI-enhanced multimodal sensing and feedback system, an interactive metaverse platform that provides users with cross-space perception capability is successfully demonstrated, in which the object in the real space of one user could be recognized and reconstructed into the virtual format, and remotely felt in real time by another user in the same metaverse virtual space through the simulated stimuli and the feedback, giving people a face-to-face like immersive virtual social experience.

Alternatively described, various embodiments of the present disclosure includes system to provide a human-machine interface to enable a user in a real space to act/sense in a virtual space. The system includes: a ring wearable by a finger of the user; a plurality of sensors, and a plurality of feedback units. The plurality of sensors being multimodal, including: a tactile sensor disposed on an inner surface of the ring; and a temperature sensor disposed on an outer surface of the ring. The plurality of feedback units being multimodal, including: a vibrator disposed on the ring, the vibrator being disposed on the outer surface of the ring; and a heater disposed on the inner surface of the ring. The system includes a controller configured to drive the plurality of sensors and the plurality of feedback devices to enable concurrent multimodal sensing and multimodal feedback.

The controller may be configured to receive an input signal from the tactile sensor responsive to a movement of the tactile sensor, wherein the controller is configured to execute instructions stored in a computer-readable medium to perform a method, the method including: determining an output signal based on a voltage integration of the input signal.

The tactile sensor may include a triboelectric nanogenerator (TENG) sensor including: a first layer, the first layer including a negatively chargeable triboelectric material; a third layer, the third layer being made of an elastically deformable and positively chargeable triboelectric material; and a second layer of aluminum film disposed between the first layer and the third layer, wherein the second layer is configured as an output electrode of the TENG sensor. The system includes a ring defining a hole, the hole being configured to receive a finger of the user therethrough, wherein the third layer defines the hole and is sized to provide the third layer in contact with a middle phalanx of the finger. The third layer may include a plurality of deformable structures extending radially toward the hole, the plurality of deformable structures being deformable by a bending action of the finger to produce a triboelectric output as the output signal.

The temperature sensor may include a pyroelectric nanogenerator (PyENG) temperature sensor, the PyENG temperature sensor being configured to provide a thermal output signal responsive to sensing a temperature of an article contacted by a first user in a real space.

The vibrator may include an eccentric rotating mass (ERM) vibrator, the ERM vibrator being configured to vibrate to provide a tactile/haptic feedback to the finger.

The heater may include a nichrome (NiCr) wire heater, the NiCr wire heater being configured to heat up to provide a temperature feedback to the finger. The system may further include a VR/AR engine, in which the VR/AR engine is configured to simulate a virtual article having a temperature property corresponding to the temperature of the article. The NiCr wire heater may be configured to heat up responsive to the temperature property of the virtual article such that a heating effect is deliverable to the finger.

Alternatively described, various embodiments of the present disclosure includes a system to provide a human-machine interface, such as to enable a user in a real space to act/sense in a virtual space. The system includes a triboelectric nanogenerator (TENG) sensor wearable by the user; and a controller. The controller is configured to receive an input signal from the TENG sensor responsive to a movement of the TENG sensor. The controller is configured to execute instructions stored in a computer-readable medium to perform a method. The method includes determining an output signal based on a voltage integration of the input signal.

Preferably, the TENG sensor includes a first layer, a second layer, and a third layer. The first layer includes a negatively chargeable triboelectric material. The third layer is made of an elastically deformable and positively chargeable triboelectric material. The second layer of aluminum film is disposed between the first layer and the third layer. The second layer is configured as an output electrode of the TENG sensor.

Preferably, the system includes a ring defining a hole. The hole is configured to receive a finger of the user therethrough. The third layer defines the hole and is sized to provide the third layer in contact with a middle phalanx of the finger.

Preferably, the third layer includes a plurality of deformable structures extending radially toward the hole. The plurality of deformable structures may be deformable by a bending action of the finger to produce a triboelectric output as the output signal.

Preferably, the ring includes a plurality of sensors and a plurality of feedback devices. The plurality of sensors and the plurality of feedback devices are controllable by the controller to enable concurrent multimodal sensing and multimodal feedback.

In some embodiments, the system includes two or more rings configured to be wearable on a respective finger of a hand of the user. Each of the two or more rings has an inner surface and an outer surface, a plurality of sensors disposed on each of the two or more rings, and a plurality of haptic feedback units disposed on the two or more rings. The plurality of sensors are configured to provide self-generated signals. The controller is configured to be in wireless signal communication with the plurality of sensors and the plurality of haptic feedback units. The plurality of sensors include a temperature sensor disposed on the outer surface of the two or more rings and the TENG sensor, The controller is configured to: (i) receive the self-generated signals from respective ones of the two or more rings, the self-generated signals; (ii) determine a respective voltage integration of the self-generated signals contributed by the TENG sensors of each of the two or more rings. The input signal corresponds to a combination of the respective voltage integration. The input signal is responsive to the one or more hand gestures of the hand. The controller is further configured to (iii) drive the plurality of feedback units based on the feedback signals from a virtual reality/augmented reality (VR/AR) engine, the VR/AR engine being in wireless signal communication with the system.

Preferably, the system is in wireless signal communication with a virtual reality/augmented reality (VR/AR) engine, in which the temperature sensor is configured to provide a thermal output signal responsive to sensing a temperature of an article contacted by a first user in a real space, and in which the VR/AR engine is configured to simulate a virtual article having a temperature property corresponding to the temperature of the article.

Preferably, the system further includes a heater disposed on an inner surface of the at least one ring wearable by a second user, in which the heater is operable responsive to the temperature property of the virtual article such that a heating effect is deliverable to the second user.

Preferably, the system further includes a vibrator disposed on the at least one ring. The vibrator is preferably in wireless communication with the controller, in which the vibrator is configured to provide tactile/haptic feedback to the user.

Preferably, the controller includes an internet-of things (IoT) module having at least one signal processing circuit; a wireless transmission unit; and a microcontroller unit electrically connected with the at least one signal processing circuit and the wireless transmission unit.

Preferably, the TENG sensor of each of the at least one ring includes a plurality of deformable structures extending radially from the inner surface and deformable by the one or more actions of the respective finger to generate the input signal.

According to various embodiments of the present disclosure, a non-transitory computer readable storage medium stores instructions that, when executed by a controller, causes the system to perform a method of human-machine interface to enable a user in a real space to act/sense in a virtual space. The method includes: receiving an input signal from a wearable sensor, determining an output signal based on a voltage integration of the input signal. The wearable sensor may be configured to provide the input signal responsive to one or more actions of a user in the real space. The output signal may be used to configure an object in the virtual space.

The input signal may include one or more pulses, each of the one or more pulses being a voltage peak value corresponding to a current action, in which the voltage peak value is independent of a preceding action preceding the current action.

The output signal may include a continuous spectrum of voltage values, in which the output signal at a time instant is dependent on at least one or both of the current action and the preceding action.

The output signal may correspond to a continuous series of bending actions of a body part of the user.

The method may include using a machine learning model to predictively determine one or more hand gestures of the user based on the continuous spectrum of voltage values.

The one or more hand gestures may include sign language gestures.

The input signal is preferably generated by a triboelectric nanogenerator (TENG) sensor.

The method may further include: training a machine learning model based on stabilized values of the voltage integration of the input signals, in which each of the stabilized values corresponds to a respective pose of the body part of the user in the real space.

The method may further include simulating corresponding changes in the object in the virtual space in response to the output signal.

All examples described herein, whether of apparatus, methods, materials, or products, are presented for the purpose of illustration and to aid understanding and are not intended to be limiting or exhaustive. Various changes and modifications may be made by one of ordinary skill in the art without departing from the scope of the invention as claimed.

The invention claimed is:

1. A system to provide a human-machine interface to enable a user in a real space to act/sense in a virtual space, the system comprising:
 a ring wearable by a finger of the user;
 a plurality of sensors, the plurality of sensors being multimodal and including:
  a tactile sensor disposed on an inner surface of the ring; and
  a temperature sensor disposed on an outer surface of the ring;
 a plurality of feedback units, the plurality of feedback units being multimodal and including:
  a vibrator disposed on the ring, the vibrator being disposed on the outer surface of the ring; and
  a heater disposed on the inner surface of the ring; and
 a controller, the controller being configured to drive the plurality of sensors and the plurality of feedback devices to enable concurrent multimodal sensing and multimodal feedback.

2. The system of claim 1, wherein the controller is configured to receive an input signal from the tactile sensor responsive to a movement of the tactile sensor, wherein the controller is configured to execute instructions stored in a computer-readable medium to perform a method, the method including: determining an output signal based on a voltage integration of the input signal.

3. The system of claim 2, wherein the tactile sensor comprises a triboelectric nanogenerator (TENG) sensor including:
 a first layer, the first layer including a negatively chargeable triboelectric material;
 a third layer, the third layer being made of an elastically deformable and positively chargeable triboelectric material; and
 a second layer of aluminum film disposed between the first layer and the third layer, wherein the second layer is configured as an output electrode of the TENG sensor.

4. The system of claim 3, wherein the temperature sensor comprises a pyroelectric nanogenerator (PyENG) temperature sensor, the PyENG temperature sensor being configured to provide a thermal output signal responsive to sensing a temperature of an article contacted by a first user in a real space.

5. The system of claim 4, wherein the vibrator comprises an eccentric rotating mass (ERM) vibrator, the ERM vibrator being configured to vibrate to provide a tactile/haptic feedback to the finger.

6. The system of claim 5, wherein the heater comprises a nichrome (NiCr) wire heater, the NiCr wire heater being configured to heat up to provide a temperature feedback to the finger.

7. The system of claim 6, further comprising a VR/AR engine, wherein the VR/AR engine is configured to simulate a virtual article having a temperature property corresponding to the temperature of the article.

8. The system of claim 7, wherein the NiCr wire heater is configured to heat up responsive to the temperature property of the virtual article such that a heating effect is deliverable to the finger.

9. The system of claim 1, wherein the system comprises a ring defining a hole, the hole being configured to receive a finger of the user therethrough, wherein the third layer defines the hole and is sized to provide the third layer in contact with a middle phalanx of the finger.

10. The system of claim 9, wherein the third layer comprises a plurality of deformable structures extending radially toward the hole, the plurality of deformable structures being deformable by a bending action of the finger to produce a triboelectric output as the output signal.

11. A system to provide a human-machine interface to enable a user in a real space to act/sense in a virtual space, the system comprising:
 a triboelectric nanogenerator (TENG) sensor wearable by the user; and
 a controller configured to receive an input signal from the TENG sensor responsive to a movement of the TENG sensor, wherein the controller is configured to execute instructions stored in a computer-readable medium to perform a method, the method including: determining an output signal based on a voltage integration of the input signal.

12. The system of claim 11, comprising:
 two or more rings configured to be wearable on a respective finger of a hand of the user, each of the two or more rings having an inner surface and an outer surface;
 a plurality of sensors disposed on each of the two or more rings, the plurality of sensors configured to provide self-generated signals; and
 a plurality of haptic feedback units disposed on the two or more rings, wherein the controller is configured to be in wireless signal communication with the plurality of sensors and the plurality of haptic feedback units, and wherein the plurality of sensors include a temperature sensor disposed on the outer surface of the two or more rings and the TENG sensor, and wherein the controller is configured to:

receive the self-generated signals from respective ones of the two or more rings;

determine a respective voltage integration of the self-generated signals contributed by the TENG sensors of each of the two or more rings, wherein the input signal corresponds a combination of the respective voltage integration, and wherein the input signal is responsive to the one or more hand gestures of the hand;

drive the plurality of feedback units based on the feedback signals from a virtual reality/augmented reality (VR/AR) engine, the VR/AR engine being in wireless signal communication with the system.

13. The method of claim 12, wherein the input signal comprises one or more pulses, each of the one or more pulses being a voltage peak value corresponding to a current action, and wherein the voltage peak value is independent of a preceding action preceding the current action.

14. The method of claim 13, wherein the output signal corresponds to a continuous series of bending actions of a body part of the user, wherein the input signal is generated by a triboelectric nanogenerator (TENG) sensor.

15. The method of claim 13, further comprising using a machine learning model to predictively determine one or more hand gestures of the user based on the continuous spectrum of voltage values.

16. The method of claim 15, wherein the one or more hand gestures comprises sign language gestures.

17. The method of claim 16, further comprising: training a machine learning model based on stabilized values of the voltage integration of the input signals, wherein each of the stabilized values corresponds to a respective pose of the body part of the user in the real space.

18. The method of claim 17, further comprising simulating corresponding changes in the object in the virtual space in response to the output signal.

19. A method executable by a controller, according to instructions stored on a non-transitory computer readable storage medium, to perform a method of human-machine interface to enable a user in a real space to act/sense in a virtual space, the method comprising:

receiving an input signal from a wearable sensor, the wearable sensor being configured to provide the input signal responsive to one or more actions of a user in the real space; and determining an output signal based on a voltage integration of the input signal.

20. The method of claim 19, wherein the output signal comprises a continuous spectrum of voltage values, and wherein the output signal at a time instant is dependent on at least one or both of the current action and the preceding action.

* * * * *